(12) United States Patent
Dai et al.

(10) Patent No.: US 9,249,241 B2
(45) Date of Patent: Feb. 2, 2016

(54) SURFACE-FUNCTIONALIZED MESOPOROUS CARBON MATERIALS

(71) Applicant: UT-Battelle, LLC, Oak Ridge, TN (US)

(72) Inventors: Sheng Dai, Knoxville, TN (US); Joanna Gorka, Knoxville, TN (US); Richard T. Mayes, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 289 days.

(21) Appl. No.: 13/851,523

(22) Filed: Mar. 27, 2013

(65) Prior Publication Data

US 2014/0294701 A1  Oct. 2, 2014

(51) Int. Cl.
| | |
|---|---|
| C08F 20/44 | (2006.01) |
| C22B 60/02 | (2006.01) |
| C22B 3/24 | (2006.01) |
| C22B 59/00 | (2006.01) |
| C08F 220/32 | (2006.01) |

(52) U.S. Cl.
CPC . *C08F 20/44* (2013.01); *C22B 3/24* (2013.01); *C22B 59/00* (2013.01); *C22B 60/0217* (2013.01); *C08F 220/32* (2013.01)

(58) Field of Classification Search
CPC ....... C08F 20/44; C08F 220/32; C22B 59/00; C22B 60/0217
See application file for complete search history.

(56) References Cited

U.S. PATENT DOCUMENTS

| | | | |
|---|---|---|---|
| 4,439,349 A | 3/1984 | Everett et al. | |
| 5,636,437 A | 6/1997 | Kaschmitter et al. | |
| 5,776,633 A | 7/1998 | Mrotek et al. | |
| 5,932,185 A | 8/1999 | Pekala et al. | |
| 5,954,937 A | 9/1999 | Farmer | |
| 6,214,204 B1 | 4/2001 | Gadkaree et al. | |
| 6,309,532 B1 | 10/2001 | Tran et al. | |
| 6,778,378 B1 | 8/2004 | Andelman | |
| 7,449,165 B2 | 11/2008 | Dai et al. | |
| 7,766,981 B2 | 8/2010 | Bourcier et al. | |
| 7,835,137 B2 | 11/2010 | Kang et al. | |
| 8,114,510 B2 | 2/2012 | Dai et al. | |
| 2006/0057051 A1 | 3/2006 | Dai et al. | |
| 2007/0253887 A1 | 11/2007 | Foley et al. | |

(Continued)

OTHER PUBLICATIONS

Characterization and catalytic performance of poly(4-vinylpyridine) supported on mesoporous carbon: comparison with poly(4-vinylpyridine) supported on mesoporous silica Journal of Porous Materials (2012), 19(5), 557-565 CODEN: JPMAFX; ISSN: 1380-2224.*

(Continued)

*Primary Examiner* — Richard M Rump
(74) *Attorney, Agent, or Firm* — Scully, Scott, Murphy & Presser, P.C.

(57) ABSTRACT

A functionalized mesoporous carbon composition comprising a mesoporous carbon scaffold having mesopores in which polyvinyl polymer grafts are covalently attached, wherein said mesopores have a size of at least 2 nm and up to 50 nm. Also described is a method for producing the functionalized mesoporous composition, wherein a reaction medium comprising a precursor mesoporous carbon, vinyl monomer, initiator, and solvent is subjected to sonication of sufficient power to result in grafting and polymerization of the vinyl monomer into mesopores of the precursor mesoporous carbon. Also described are methods for using the functionalized mesoporous carbon, particularly in extracting metal ions from metal-containing solutions.

27 Claims, 14 Drawing Sheets

(56) References Cited

U.S. PATENT DOCUMENTS

| | | |
|---|---|---|
| 2008/0152577 A1 | 6/2008 | Addiego et al. |
| 2008/0274407 A1 | 11/2008 | Bourcier et al. |
| 2009/0141422 A1 | 6/2009 | Bourcier |
| 2009/0208780 A1 | 8/2009 | Sun et al. |
| 2009/0305138 A1 | 12/2009 | Baca et al. |
| 2009/0320253 A1 | 12/2009 | Bourcier et al. |
| 2011/0229401 A1 | 9/2011 | Dai et al. |
| 2012/0121498 A1 | 5/2012 | Dai et al. |
| 2012/0234695 A1 | 9/2012 | Mayes et al. |

OTHER PUBLICATIONS

Kim, Jin Hoe, et al. "Removal of uranium (VI) from aqueous solutions by nanoporous carbon and its chelating polymer composite." Journal of radioanalytical and nuclear chemistry 286.1 (2010): 129-133.*

Hwang, Chih-Chau, et al. "In situ synthesis of polymer-modified mesoporous carbon CMK-3 composites for CO2 sequestration." ACS applied materials & interfaces 3.12 (2011): 4782-4786.*

Zhu, Shenmin, et al. "Thermo-responsive polymer-functionalized mesoporous carbon for controlled drug release." Materials Chemistry and Physics 126.1 (2011): 357-363.*

Górka, Joanna, et al. "Sonochemical functionalization of mesoporous carbon for uranium extraction from seawater." Journal of Materials Chemistry A 1.9 (2013): 3016-3026.*

Liu, Xin, et al. "Synthesis of porous acrylonitrile/methyl acrylate copolymer beads by suspended emulsion polymerization and their adsorption properties after amidoximation." Journal of hazardous materials 175.1 (2010): 1014-1021.*

Warren S.C. et al., "Ordered Mesoporous Materials from Metal Nanoparticle-Block Copolymer Self-Assembly", Science 320:1748-1752 (Jun. 27, 2008).

Xu H. et al., "Sonochemical Preparation of Functionalized Graphenes", Journal of the American Chemical Society 133:9148-9151 (2011), and Supporting Information.

Xu P. et al., "Treatment of Brackish Produced Water Using Carbon Aerogel-Based Capacitive Deionization Technology", Water Research 42:2605-2617 (2008).

Zhang F. et al., "An Aqueous Cooperative Assembly Route to Synthesize Ordered Mesoporous Carbons with Controlled Structures and Morphology", Chem. Mater. 18:5279-5288 (2006).

Zhang F. et al., "A Facile Aqueous Route to Synthesize Highly Ordered Mesoporous Polymers and Carbon Frameworks with Ia3d Bicontinuous Cubic Structure", J. Am. Chem. Soc. 127(39):13508-13509 (2005).

Zhou H. et al., "A Self-Ordered, Crystalline-Glass, Mesoporous Nanocomposite for Use as a Lithium-Based Storage Device With Both High Power and High Energy Densities", Angew. Chem. Int. Ed. 44:797-802 (2005).

Adelhelm P. et al., "Generation of Hierarchical Meso- and Macroporous Carbon from Mesophase Pitch by Spinodal Decomposition using Polymer Templates", Adv. Mater 19:4012-4017 (2007).

Carriazo D. et al., "Block-Copolymer Assisted Synthesis of Hierarchical Carbon Monoliths Suitable as Supercapacitor Electrodes", Journal of Materials Chemistry 20:773-780 (2010).

Chen Q. et al., "Aggregation Behavior of Single-Walled Carbon Nanotubes in Dilute Aqueous Suspension", Journal of Colloid and Interface Science 280:91-97 (2004).

Das S. et al., "Chemical Aspects of Uranium Recovery from Seawater by Amidoximated Electron-Beam-Grafted Polypropylene Membranes", Desalination 232:243-253 (2008).

Davies R.V. et al., "Extraction of Uranium from Sea Water", Nature 203:1110-1115 (Sep. 12, 1964).

Frackowiak E. et al., "Carbon Materials for the Electrochemical Storage of Energy in Capacitors", Carbon 39:937-950 (2001).

Fulvio P.F. et al., ""Brick-and-Mortar" Self-Assembly Approach to Graphitic Mesoporous Carbon Nanocomposites", Advanced Functional Materials 21:2208-2215 (2011), along with Supporting Information (4 pages).

Gorka J. et al., "Sonochemical Functionalization of Mesoporous Carbon for Uranium Extraction from Seawater", Journal of Materials Chemistry A 1:3016-3026 (2013).

Gorka J. et al., "Sonochemical Functionalization of Ordered Mesoporous Carbons and Their Applications in Uranium Adsorption from Seawater", 2012 MRS Spring Meeting, San Francisco, CA, Apr. 9-13, 2012, pp. DD11.16.

Gorka J. et al., "The Synergistic Effect of Sonochemical Grafting and Hierarchical Porosity of Carbons on Uranium Adsorption from Seawater", Abstracts of Papers, 244th ACS National Meeting & Exposition, Philadelphia, PA, United States, Aug. 19-23, 2012, pp. 1+EC-102.

Gorka J. et al., "Functionalized Carbon Materials as Uranium Adsorbents", Abstracts of Papers, 244th ACS National Meeting & Exposition, Philadelphia, PA, United States, Aug. 19-23, 2012, pp. 1+EC-57.

Gorka J. et al., "Hierarchically Porous Phenolic Resin-Based Carbons Obtained by Block Copolymer-Colloidal Silica Templating and Post-Synthesis Activation With Carbon Dioxide and Water Vapor", Carbon 49:154-160 (2011).

Gorka J. et al., "KOH Activation of Mesoporous Carbons Obtained by Soft-Templating", Carbon 46:1159-1174 (2008).

Guo B. et al., "Soft-Templated Mesoporous Carbon-Carbon Nanotube Composites for High Performance Lithium-Ion Batteries", Advanced Materials 23:4661-4666 (2011), along with Supporting Information (5 pages).

Hou C-H. et al., "Electrosorption Capacitance of Nanostructured Carbon-Based Materials", Journal of Colloid and Interface Science 302:54-61 (2006).

Huang Y. et al., "One-Step Hydrothermal Synthesis of Ordered Mesostructured Carbonaceous Monoliths With Hierarchical Porosities", Chem. Commun. pp. 2641-2643 (2008).

Huang Y. et al., "Highly Ordered Mesoporous Carbonaceous Frameworks from a Template of a Mixed Amphiphilic Triblock-Copolymer System of PEO-PPO-PEO and Reverse PPO-PEO-PPO", Chemistry an Asian Journal 2:1282-1289 (2007).

Huang Y. et al., "Formation of Mesoporous Carbon With a Face-Centered-Cubic Fd3m Structure and Bimodel Architectural Pores from the Reverse Amphiphilic Triblock Copolyer PPO-PEO-PPO", Angew. Chem. Int. Ed. 46:1089-1093 (2007).

Jaroniec M. et al., "Improvement of the Kruk-Jaroniec-Sayari Method for Pore Size Analysis of Ordered Silicas With Cylindrical Mesopores", Langmuir 22(16):6757-6760 (2006).

Jung H. et al., "Capacitive Deionization Characteristics of Nanostructured Carbon Aerogel Electrodes Synthesized Via Ambient Drying", Desalination, 216:377-385 (2007).

Kang S.O. et al., "Cyclic Imide Dioximes: Formation and Hydrolytic Stability", Industrial & Engineering Chemistry Research 51:6619-6624 (2012).

Kavakli P.A. et al., "A Highly Efficient Chelating Polymer for the Adsorption of Uranyl and Vanadly Ions at Low Concentrations", Adsorption 10:309-315 (2004).

Korenblit Y. et al., "High-Rate Electrochemical Capacitors Based on Ordered Mesoporous Silicon Carbide-Derived Carbon", ACSNANO 4(3):1337-1344 (2010).

Kruk M. et al., "Partially Graphitic, High-Surface-Area Mesoporous Carbons from Polyacrylonitrile Templated by Ordered and Disordered Mesoporous Silicas", Microporous and Mesoporous Materials 102:178-187 (2007).

Kudo H. et al., "Molecular Waterwheel (Noria) from a Simple Condensation of Resorcinol and an Alkanedial", Angew. Chem. Int. Ed. 45:7948-7952 (2006).

Lee J. et al., "Recent Progress in the Synthesis of Porous Carbon Materials", Advanced Materials 18(16):2073-2094 (2006).

Liang C. et al., "Dual Phase Separation for Synthesis of Bimodal Meso-/Macroporous Carbon Monoliths", Chem. Mater. 21:2115-2124 (2009).

Liang C. et al., "Mesoporous Carbon Materials: Synthesis and Modification", Angew. Chem. Int. Ed. 47:3696-3717 (2008).

Liang C. et al., "Synthesis of Mesoporous Carbon Materials Via Enhanced Hydrogen-Bonding Interaction", Journal of the American Chemical Society 128(16):5316-5317 (2006).

(56) References Cited

OTHER PUBLICATIONS

Liang C. et al., "Synthesis of a Large-Scale Highly Ordered Porous Carbon Film by Self-Assembly of Block Copolymers", Angew. Chem. Int. Ed. 43:5785-5789 (2004).
Liu C. et al., "Facile Synthesis of Ordered Mesoporous Carbons from F108/Resorcinol-Formaldehyde Composites Obtained in Basic Media", Chem. Commun., pp. 757-759 (2007).
Mayes R.T. et al., "Hierarchical Ordered Mesoporous Carbon from Phloroglucinol-Glyoxal and its Application in Capacitive Deionization of Brackish Water", Journal of Materials Chemistry 20:8674-8678 (2010).
Meng Y. et al., "Ordered Mesoporous Polymers and Homologous Carbon Frameworks: Amphiphilic Surfactant Templating and Direct Transformation", Angew. Chem. Int. Ed. 44(43):7053-7059 (2005).
Omichi H. et al., "A New Type of Amidoxime-Group-Containing Adsorbent for the Recovery of Uranium from Seawater. III. Recycle Use of Adsorbent", Separation Science and Technology 21(6&7):563-574 (1986).
Pandolfo A.G. et al., "Carbon Properties and Their Role in Supercapacitors", Journal of Power Sources 157:11-27 (2006).
Pech D. et al., "Ultrahigh-Power Micrometre-Sized Supercapacitors Based on Onion-Like Carbon", Nature Nanotechnology 5:651-654 (Sep. 2010).
Pekala R.W. et al., "Carbon Aerogels for Electrochemical Applications", Journal of Non-Crystalline Solids 225:74-80 (1998).
Portet C. et al., "Electrochemical Characterizations of Carbon Nanomaterials by the Cavity Microelectrode Technique", Electrochimica Acta 53:7675-7680 (2008).
Portet C. et al., "Electrochemical Performance of Carbon Onions, Nanodiamonds, Carbon Black and Multiwalled Nanotubes in Electrical Double Layer Capacitors", Carbon 45:2511-2518 (2007).

Ramires E.C. et al., "Biobased Composites from Glyoxal-Phenolic Resins and Sisal Fibers", Bioresource Technology 101:1998-2006 (2010).
Rao T.P. et al., "Preconcentration Techniques for Uranium(VI) and Thorium(IV) Prior to Analytical Determination—an Overview", Talanta 68:1047-1064 (2006).
Ryoo R. et al., "Ordered Mesoporous Carbons", Advanced Materials 13(9):677-681 (2001).
Ryoo R. et al., "Synthesis of Highly Ordered Carbon Molecular Sieves Via Template-Mediated Structural Transformation", The Journal of Physical Chemistry B 103(37):7743-7746(Sep. 16, 1999).
Saito K. et al., "Diffusivities of Uranium in Artificial Seawater", Kagaku Kogaku Ronbunshu 7(6):545-548 (1981), together with an English-language abstract.
Simon P. et al., "Charge Storage Mechanism in Nanoporous Carbons and its Consequence for Electrical Double Layer Capacitors", Philosophical Transactions of the Royal Society A 368:3457-3467 (2010).
Simon P. et al., "Materials for Electrochemical Capacitors", Nature Materials 7:845-854 (Nov. 2008).
Tanaka S. et al., "Synthesis of Ordered Mesoporous Carbons with Channel Structure from an Organic-Organic Nanocomposite", Chem. Commun., pp. 2125-2127 (2005).
Vukovic S. et al., "How Amidoximate Binds the Uranyl Cation", Inorganic Chemistry 51:3855-3859 (2012).
Wang X. et al., "Preparation of Activated Mesoporous Carbons for Electrosorption of Ions from Aqueous Solutions", Journal of Materials Chemistry 20:4602-4608 (2010).
Wang X. et al., "Facile Synthesis of Ordered Mesoporous Carbons with High Thermal Stability by Self-Assembly of Resorcinol-Formaldehyde and Block Copolymers Under Highly Acidic Conditions", Langmuir 24(14):7500-7505 (2008).

* cited by examiner (8A) (8B)

(9A) (9B)

SURFACE-FUNCTIONALIZED MESOPOROUS CARBON MATERIALS

This invention was made with government support under Prime Contract No. DE-AC05-00OR22725 awarded by the U.S. Department of Energy. The government has certain rights in the invention.

FIELD OF THE INVENTION

The present invention relates to the field of porous carbon materials, and more particularly, to mesoporous carbon materials, and particulate forms and films thereof.

BACKGROUND OF THE INVENTION

Mesoporous carbon materials have found an increasing number of utilities, e.g., in gas separation, water purification (i.e., nanofiltration), catalysis, carbon dioxide adsorption, capacitive deionization (CDI), energy storage and conversion, and as advanced electrode materials, such as capacitive, supercapacitive, and battery electrode (e.g., lithium-ion) materials. Nevertheless, a key obstacle in directing the mesoporous carbon compositions to these and other applications is the known difficulty in modifying the surfaces of these materials with any of a wide variety of functional groups that could make the mesoporous carbon materials better suited for the intended purpose.

In an effort to further advance mesoporous carbon materials in such practical applications, there would be a substantial benefit in a method capable of functionalizing mesoporous carbon materials with any of a variety of functional groups. The method would preferably be cost effective and scalable for bulk production. Moreover, the method would preferably be effective in functionalizing the interior of the mesopores, since the bulk of the activity and reactivity of mesoporous carbon compositions are found in the mesopores. The latter requirement is non-trivial, as traditional polymer grafting techniques do not provide the mass transport necessary for functionalizing such miniaturized spaces.

SUMMARY OF THE INVENTION

In one aspect, the invention is directed to a functionalized mesoporous carbon composition produced according to the method described herein. The functionalized mesoporous carbon composition described herein has any of a wide variety of functional groups, including, for example, heteroatom-containing functional groups (e.g., metal-binding or metal-chelating groups, hydrophilizing groups, or negatively- or positively-charged groups), or unsubstituted hydrocarbon groups that maintain or impart a greater degree of hydrophobicity. In some embodiments, the functionalized carbon composition is highly thermally robust and may or may not be conductive.

In particular embodiments, the functionalized mesoporous carbon composition contains a mesoporous carbon scaffold having mesopores in which polyvinyl polymer grafts are covalently attached. The polyvinyl polymer grafts can have any of the functional groups described above. In particular embodiments, the polyvinyl polymer grafts have the general formula:

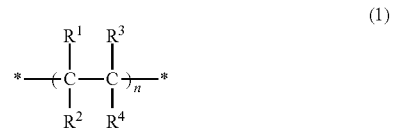

In Formula (1) above, $R^1$, $R^2$, $R^3$, and $R^4$ are independently selected from hydrogen atom, hydrocarbon groups having at least 1 and up to 12 carbon atoms, and heteroatom-containing groups comprising at least one heteroatom selected from nitrogen, oxygen, sulfur, and phosphorus; and the subscript n is an integer of at least 2. By necessity, the composition of Formula (1) has a terminating (capping) group, which may be any of the groups provided for groups $R^1$, $R^2$, $R^3$, and $R^4$.

In another aspect, the invention is directed to a method for fabricating the above-described functionalized mesoporous carbon composition. In the method, a reaction medium that includes a precursor mesoporous carbon, vinyl monomer, initiator, and solvent, is subjected to sonication of sufficient power to result in grafting and polymerization of the vinyl monomer into mesopores of the precursor mesoporous carbon to produce the functionalized mesoporous carbon composition. In particular embodiments, the vinyl monomer has the formula:

In Formula (2) above, $R^1$, $R^2$, $R^3$, and $R^4$ are independently selected from hydrogen atom, hydrocarbon groups having at least 1 and up to 12 carbon atoms, and heteroatom-containing groups containing at least one heteroatom selected from nitrogen, oxygen, sulfur, and phosphorus. The groups $R^1$, $R^2$, $R^3$, and $R^4$ can be or include, for example, any of the types of functional groups described above. In some embodiments, at least one of $R^1$, $R^2$, $R^3$, and $R^4$ is selected from heteroatom-containing functional groups. In other embodiments, at least one of $R^1$, $R^2$, $R^3$, and $R^4$ is selected from unsubstituted hydrocarbon groups. In particular embodiments, at least one of $R^1$, $R^2$, $R^3$, and $R^4$ is selected from metal-binding or metal-chelating functional groups, such as carboxylate, keto, aldo, amino, imino, amido, oxime, and amidoxime groups. In some embodiments, one or more of $R^1$, $R^2$, $R^3$, and $R^4$ are functional groups (e.g., nitrile) that are subsequently transformed into another group (e.g., amidoxime) after polymerization of the vinyl monomer.

In another aspect, the invention is directed to a method for extracting metal ions from a liquid (e.g., aqueous) solution containing metal ions by contacting the liquid solution with a functionalized mesoporous carbon composition described above, wherein at least a portion of the polyvinyl polymer grafts include heteroatom-containing functional groups that can bind to the metal ions. In particular embodiments, the heteroatom-containing functional groups that can bind to the metal ions are selected from carboxylate, keto, aldo, amino, imino, amido, oxime, and amidoxime groups. The metal ions being extracted can be any desired metal ions, but are more typically selected from transition and rare earth metals, wherein the rare earth metals include the lanthanide and actinide metals.

By virtue of the instant methodology, mesoporous carbon materials can be effectively and efficiently functionalized with any of a variety of functional groups, thereby rendering the mesoporous carbon composition particularly suited for any of a number of different applications. The method is further advantageous in that it is practical and cost effective for large scale production, and moreover, highly effective in functionalizing the interior of the mesopores. The functionalization of mesopore interiors has herein been achieved primarily by use of the sonochemical grafting and polymerization process described above. The sonochemical grafting and polymerization process described herein has been found to provide a greater mass transfer capability effective for grafting the interior of mesopores found in mesoporous carbon materials.

DETAILED DESCRIPTION OF THE INVENTION

Figure 1:
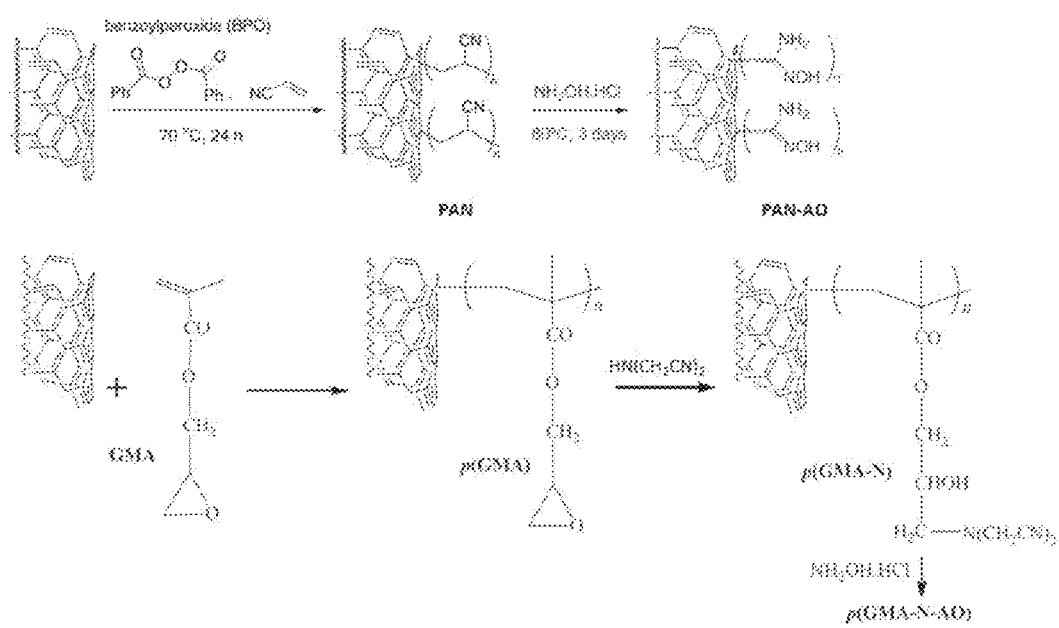
FIG. 1. Schematic showing two different methodologies for incorporating polymeric grafts into and/or onto a mesoporous carbon, wherein the polymeric grafts are ultimately functionalized with amidoxime groups, as provided by reacting polyacrylonitrile (PAN) precursor grafts with hydroxylamine.

As used herein, the term "about" generally indicates within ±0.5%, 1%, 2%, 5%, or up to ±10% of the indicated value. For example, a pore size of about 10 nm generally indicates in its broadest sense 10 nm±10%, which indicates 9.0-11.0 nm. Alternatively, the term "about" can indicate a variation or average in a physical characteristic of a group, e.g., a population of pores.

The term "hydrocarbon group" or "hydrocarbon linker" (also identified as "R"), as used herein, designates, in a first embodiment, groups or linkers composed solely of carbon and hydrogen and containing at least one carbon-hydrogen bond. In different embodiments, one or more of the hydrocarbon groups or linkers can contain precisely, or a minimum of (i.e., at least or above), or a maximum of (i.e., up to or less than), for example, one, two, three, four, five, six, seven, eight, nine, ten, eleven, or twelve carbon atoms, or a number of carbon atoms within a particular range bounded by any two of the foregoing carbon numbers. Hydrocarbon groups or linkers in different compositions described herein, or in different positions of a composition, may possess the same or different number (or preferred range thereof) of carbon atoms in order to independently adjust or optimize the activity or other characteristics of the composition.

The hydrocarbon groups or linkers can be, for example, saturated and straight-chained (i.e., straight-chained alkyl groups or alkylene linkers). Some examples of straight-chained alkyl groups (or alkylene linkers) include methyl (or methylene linker, i.e., —$CH_2$—, or methine linker), ethyl (or ethylene or dimethylene linker, i.e., —$CH_2CH_2$— linker), n-propyl, n-butyl, n-pentyl, n-hexyl, n-heptyl, n-octyl, n-nonyl, n-decyl, n-undecyl, and n-dodecyl groups (or their respective linker analogs).

The hydrocarbon groups or linkers can alternatively be saturated and branched (i.e., branched alkyl groups or alkylene linkers). Some examples of branched alkyl groups include isopropyl, isobutyl, sec-butyl, t-butyl, isopentyl, neopentyl, 2-methylpentyl, and 3-methylpentyl. Some examples of branched alkylene linkers are those derived by removal of a hydrogen atom from one of the foregoing exemplary branched alkyl groups (e.g., isopropylene, —$CH(CH_3)CH_2$—).

The hydrocarbon groups or linkers can alternatively be saturated and cyclic (i.e., cycloalkyl groups or cycloalkylene linkers). Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane). Some examples of cycloalkylene linkers are those derived by removal of a hydrogen atom from one of the foregoing exemplary cycloalkyl groups.

The hydrocarbon groups or linkers can alternatively be unsaturated and straight-chained (i.e., straight-chained olefinic or alkenyl groups or linkers). The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl ($CH_2$=CH—$CH_2$—$CH_2$—), 2-buten-1-yl ($CH_2$—CH=CH—$CH_2$—), butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, and propargyl (2-propynyl). Some examples of straight-chained olefinic linkers are those derived by removal of a hydrogen atom from one of the foregoing exemplary straight-chained olefinic groups (e.g., vinylene, —CH═CH—, or vinylidene).

The hydrocarbon groups or linkers can alternatively be unsaturated and branched (i.e., branched olefinic or alkenyl groups or linkers). Some examples of branched olefinic groups include propen-2-yl, 3-buten-2-yl (CH$_2$═CH—CH.—CH$_3$), 3-buten-3-yl (CH$_2$═C.—CH$_2$—CH$_3$), 4-penten-2-yl, 4-penten-3-yl, 3-penten-2-yl, 3-penten-3-yl, and 2,4-pentadien-3-yl. Some examples of branched olefinic linkers are those derived by removal of a hydrogen atom from one of the foregoing exemplary branched olefinic groups.

The hydrocarbon groups or linkers can alternatively be unsaturated and cyclic (i.e., cycloalkenyl groups or cycloalkenylene linkers). The unsaturated and cyclic group can be aromatic or aliphatic. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene. Some examples of cycloalkenylene linkers are those derived by removal of a hydrogen atom from one of the foregoing exemplary cycloalkenyl groups (e.g., phenylene and biphenylene).

One or more of the hydrocarbon groups or linkers may also include one or more heteroatoms (i.e., non-carbon and non-hydrogen atoms), such as one or more heteroatoms selected from oxygen, nitrogen, sulfur, silicon, phosphorus, boron, and halide atoms, as well as groups containing one or more of these heteroatoms (i.e., heteroatom-containing groups). Some examples of oxygen-containing groups include hydroxy (OH), alkoxy (OR), carbonyl-containing (e.g., carboxylic acid, ketone, aldehyde, carboxylic ester, amide, and urea functionalities), nitro (NO$_2$), carbon-oxygen-carbon (ether), sulfonyl, and sulfinyl (i.e., sulfoxide) groups. The ether group can also be a polyalkyleneoxide group, such as a polyethyleneoxide group. Some examples of nitrogen-containing groups include primary amine, secondary amine, tertiary amine (i.e., —NR$_2$ or NR$_3^+$, wherein R is independently selected from H and hydrocarbon groups set forth above), cyanide (i.e., nitrile), amide (i.e., —C(O)NR$_2$ or —NRC(O)R, wherein R is independently selected from hydrogen atom and hydrocarbon groups set forth above), imine (e.g., —CR═NR, wherein R is independently H or a hydrocarbon group), oxime (—CR═N—OH), amidoxime (—C(NH$_2$)═N—OH), nitro, urea (—NR—C(O)—NR$_2$, wherein R is independently H or a hydrocarbon group), and carbamate groups (—NR—C(O)—OR, wherein R is independently H or a hydrocarbon group). Some examples of phosphorus-containing groups include —PR$_2$, —PR$_3^+$, —P(═O)R$_2$, —P(OR)$_2$, —O—P(OR)$_2$, —R—P(OR)$_2$, —P(═O)(OR)$_2$, —O—P(═O)(OR)$_2$, —O—P(═O)(OR)(R), —O—P(═O)R$_2$, —R—P(═O)(OR)$_2$, —R—P(═O)(OR)(R), and —R—P(═O)R$_2$ groups, wherein R is independently selected from hydrogen atom and hydrocarbon groups set forth above. Some examples of sulfur-containing groups include mercapto (i.e., —SH), thioether (i.e., sulfide, e.g., —SR), disulfide (—R—S—S—R), sulfoxide (—S(O)R), sulfone (—SO$_2$R), sulfonate (—S(═O)$_2$OR, wherein R is H, a hydrocarbon group, or a cationic group), and sulfate groups (—OS(═O)$_2$OR, wherein R is H, a hydrocarbon group, or a cationic group). Some examples of halide atoms include fluorine, chlorine, bromine, and iodine. One or more of the heteroatoms described above (e.g., oxygen, nitrogen, and/or sulfur atoms) can be inserted between carbon atoms (e.g., as —O—, —NR—, or —S—) in any of the hydrocarbon groups described above to form a heteroatom-substituted hydrocarbon group or linker. Alternatively, or in addition, one or more of the heteroatom-containing groups can replace one or more hydrogen atoms on the hydrocarbon group or linker. Some particular examples of alkoxy groups —OR include methoxy, ethoxy, n-propoxy, isopropoxy, n-butoxy, isobutoxy, t-butoxy, phenoxy, benzyloxy, 2-hydroxyethoxy, 2-methoxyethoxy, 2-ethoxyethoxy, vinyloxy, and allyloxy groups.

In embodiments where the hydrocarbon group is or includes a cyclic group, the cyclic group may be, for example, monocyclic by containing a single ring without connection or fusion to another ring. The cyclic hydrocarbon group may alternatively be, for example, bicyclic, tricyclic, tetracyclic, or a higher polycyclic ring system by having at least two rings interconnected (i.e., by a bond) and/or fused.

In some embodiments, the cyclic hydrocarbon group is carbocyclic, i.e., does not contain ring heteroatoms (i.e., only ring carbon atoms). In different embodiments, ring carbon atoms in the carbocyclic group are all saturated, or a portion of the ring carbon atoms are unsaturated, or the ring carbon atoms are all unsaturated, as found in aromatic carbocyclic groups, which may be monocyclic, bicyclic, tricylic, or higher polycyclic aromatic groups.

In some embodiments, the hydrocarbon group is or includes a cyclic or polycyclic group that includes at least one ring heteroatom (for example, one, two, three, four, or higher number of heteroatoms). Such ring heteroatom-substituted cyclic groups are referred to herein as "heterocyclic groups". As used herein, a "ring heteroatom" is an atom other than carbon and hydrogen (typically, selected from nitrogen, oxygen, and sulfur) that is inserted into, or replaces a ring carbon atom in a hydrocarbon ring structure. In some embodiments, the heterocyclic group is saturated, while in other embodiments, the heterocyclic group is unsaturated (i.e., aliphatic or aromatic heterocyclic groups, wherein the aromatic heterocyclic group is also referred to herein as a "heteroaromatic ring" or a "heteroaromatic fused-ring system" in the case of at least two fused rings, at least one of which contains at least one ring heteroatom). In some embodiments, the heterocyclic group is bound via one of its ring carbon atoms to another group (i.e., other than hydrogen atom and adjacent ring atoms), while the one or more ring heteroatoms are not bound to another group. In other embodiments, the heterocyclic group is bound via one of its heteroatoms to another group, while ring carbon atoms may or may not be bound to another group.

Some examples of saturated heterocyclic groups include those containing at least one oxygen atom (e.g., oxetane, tetrahydrofuran, tetrahydropyran, 1,4-dioxane, 1,3-dioxane, and 1,3-dioxepane rings), those containing at least one nitrogen atom (e.g., pyrrolidine, piperidine, piperazine, imidazolidine, azepane, and decahydroquinoline rings), those containing at least one sulfur atom (e.g., tetrahydrothiophene, tetrahydrothiopyran, 1,4-dithiane, 1,3-dithiane, and 1,3-dithiolane rings), those containing at least one oxygen atom and at least one nitrogen atom (e.g., morpholine and oxazolidine rings), those containing at least one oxygen atom and at least one sulfur atom (e.g., 1,4-thioxane), and those containing at least one nitrogen atom and at least one sulfur atom (e.g., thiazolidine and thiamorpholine rings).

Some examples of unsaturated heterocyclic groups include those containing at least one oxygen atom (e.g., furan, pyran, 1,4-dioxin, and dibenzodioxin rings), those containing at least one nitrogen atom (e.g., pyrrole, imidazole, pyrazole, pyridine, pyrazine, pyrimidine, 1,3,5-triazine, azepine, diazepine, indole, purine, benzimidazole, indazole, 2,2'-bipyridine, quinoline, isoquinoline, phenanthroline, quinoxaline, quinazoline, pyridazine, and cinnoline), those containing at least one sulfur atom (e.g., thiophene, thianaphthene, and benzothiophene rings), those containing at least one oxygen atom and at least one nitrogen atom (e.g., oxazole, isoxazole, benzoxazole, benzisoxazole, and oxazoline rings), and those containing at least one nitrogen atom and at least one sulfur atom (e.g., thiazole, isothiazole, benzothiazole, benzoisothiazole, and thiazoline rings).

As used herein, the term "heteroatom-containing groups" refers to any group that contains at least one heteroatom. In one embodiment, the heteroatom-containing group does not include a hydrocarbon portion (i.e., no portion that includes at least one carbon-hydrogen bond). Some examples of such heteroatom-containing groups include —OH, —SH, —O—, —S—, —C(O)OH, —C(S)OH, —C(O)O$^-$Na$^+$, —C(O)H, —NH$_2$, —NH$_3^+$, —C(O)NH$_2$, —NHC(O)NH$_2$, —NO$_2$, —SO$_3$H, —SO$_3^-$Na$^+$, —OSO$_3$H, —OSO$_3^-$Na$^+$, —Si(OCH$_3$)$_3$, —Si(OH)$_3$, —SiR$_2$—O—, —PO$_3$H, —PO$_3^-$Na$^+$, —OPO$_3$H, —OPO$_3^-$Na$^+$, —BH$_2$, and —BH—. In another embodiment, the heteroatom-containing group includes a hydrocarbon portion, such as any of the heteroatom-containing hydrocarbon groups described above, e.g., —OCH$_3$, —OCH$_2$CH$_3$, —OCH(CH$_3$)$_2$, —SCH$_3$, —SCH$_2$CH$_3$, —SCH(CH$_3$)$_2$, —CH$_2$CH$_2$OCH$_2$CH$_3$, —OCH$_2$CH$_2$OCH$_2$CH$_2$OCH$_2$CH$_3$, —C(O)OCH$_3$, —C(O)OCH$_2$CH$_3$, —C(O)OCH(CH$_3$)$_2$, —C(O)CH$_3$, —C(O)CH$_2$CH$_3$, —C(O)CH(CH$_3$)$_2$, —CH$_2$C(O)CH$_2$C(O)CH$_3$, —NH(CH$_3$), —N(CH$_3$)$_2$, —N(CH$_3$)$_3^+$, —NHCH$_2$NH$_2$, —NHCH$_2$CH$_2$NH$_2$, —NHCH$_2$N(CH$_3$)$_2$, —CH$_2$CH$_2$N(CH$_3$)$_2$, —CH$_2$CH$_2$N(CH$_3$)$_3^+$, —C(O)N(CH$_3$)$_2$, —C(O)NHCH$_3$, —C(O)NHCH$_2$CH$_2$NH$_2$, —NHC(O)N(CH$_3$)$_2$, —NO$_2$, —P(CH$_3$)$_2$, —P(C$_6$H$_5$)$_2$, —P(CH$_3$)$_3^+$, —P(C$_6$H$_5$)$_3^+$, —P(=O)(CH$_3$)$_2$, —P(=O)(C$_6$H$_5$)$_2$, —P(OCH$_3$)$_2$, —P(OC$_6$H$_5$)$_2$, —OP(OCH$_3$)$_2$, —OP(OC$_6$H$_5$)$_2$, —CH$_2$—P(OC$_6$H$_5$)$_2$, —C$_6$H$_5$—P(OC$_6$H$_5$)$_2$, —P(=O)(OCH$_3$)$_2$, —P(=O)(OC$_2$H$_5$)$_2$, —O—P(=O)(OC$_2$H$_5$)$_2$, —O—P(=O)(OC$_2$H$_5$)(CH$_3$), —O—P(=O)(CH$_3$)$_2$, —CH$_2$—P(=O)(OCH$_3$)$_2$, —C$_6$H$_5$—P(=O)(OCH$_3$)$_2$, —C$_6$H$_5$—P(=O)(OCH$_3$)(CH$_3$), —C$_6$H$_5$—P(=O)(CH$_3$)$_2$, —B(CH$_3$)$_2$, and —B(CH$_3$)—. Any of the generic forms or specific types of heteroatom-containing groups described above may function as any of the groups R$^1$, R$^2$, R$^3$, and R$^4$. Alternatively, any one or more of R$^1$, R$^2$, R$^3$, and R$^4$ groups may be a hydrocarbon group (R) substituted one or more times with any of the foregoing heteroatom-containing functional groups.

Any of the above heteroatom-containing functional groups may or may not also have the ability to bind or chelate to metal ions. As known in the art, the term "chelate" refers to the ability of a heteroatom-containing functional group to bind to a metal species via at least two, three, four, or more different heteroatoms contained in the group. The ability or inability for a heteroatom-containing functional group to bind or chelate to a metal species is dependent on several factors, particularly the type of metal species. The heteroatom-containing functional group may also be a charged group, such as any of the positively-charged or negatively-charged functional groups described above (e.g., ammonium, phosphonium, sulfonium, carboxylate, sulfate, sulfonate, phosphate, phosphite, or phosphonate).

In one aspect, the invention is directed to a functionalized mesoporous carbon composition. The functionalized mesoporous carbon composition contains a mesoporous carbon scaffold having mesopores in which polyvinyl polymer grafts are covalently attached. The polyvinyl polymer grafts are polymeric units derived from polymerization (typically, addition polymerization) of vinylic monomer units, as further described below. The polyvinyl polymer grafts typically contain saturated carbon-carbon bonds in the polymer backbone; however, the polyvinyl polymer grafts may, in some instances, include carbon-carbon double bonds in the polymer backbone, as in polybutadiene. In one embodiment, the polyvinyl polymer grafts include only hydrogen atoms and/or unsubstituted hydrocarbon groups on the polymer backbone. In another embodiment, the polyvinyl polymer grafts include heteroatom-containing functional groups attached to the polymer backbone. As described above, the heteroatom-containing groups may or may not include hydrocarbon portions, and may be uncharged or charged, or may be useful in binding or chelating to metal ions, or may confer a substantial degree of hydrophilicity to permit an improved level of surface interaction of the mesoporous carbon surface with water, an aqueous solution, or polar organic solvents (e.g., alcohols).

In particular embodiments, the polyvinyl polymer grafts have the formula:

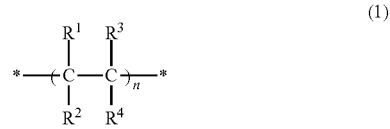

(1)

In Formula (1), R$^1$, R$^2$, R$^3$, and R$^4$ are independently selected from hydrogen atom, hydrocarbon groups having at least 1 and up to 12 carbon atoms, and heteroatom-containing functional groups comprising at least one heteroatom selected from nitrogen, oxygen, sulfur, and phosphorus. In some embodiments, the groups R$^1$, R$^2$, R$^3$, and R$^4$ are the same over all polymeric units n. In other embodiments, one or more of the groups R$^1$, R$^2$, R$^3$, and R$^4$ may be different over polymeric units n, in which case the polyvinyl polymer graft is copolymeric, such as a block, alternating, or random copolymer. Moreover, Formula (1) can represent a portion (e.g., a block of a copolymer) or the entire polyvinyl polymer graft. By necessity, the composition of Formula (1) has a terminating (capping) group, which may be any of the groups provided for groups R$^1$, R$^2$, R$^3$, and R$^4$.

The subscript n is an integer of at least 2. In different embodiments, n can be an integer of at least, above, up to, or less than, for example, 3, 4, 5, 6, 7, 8, 9, 10, 15, 20, 25, 30, 35, 40, 45, 50, 100, 150, 200, 250, or 300, or an integer within a range bounded by any two of the foregoing values.

In a first particular set of embodiments of Formula (1), all of R$^1$, R$^2$, R$^3$, and R$^4$ are hydrogen atoms. In a second particular set of embodiments of Formula (1), three of R$^1$, R$^2$, R$^3$, and R$^4$ (e.g., R$^1$, R$^2$, and R$^4$) are hydrogen atoms with the remaining one of R$^1$, R$^2$, R$^3$, and R$^4$ being a hydrocarbon group or heteroatom-containing functional group. In a third particular set of embodiments of Formula (1), two of R$^1$, R$^2$, R$^3$, and R$^4$ (e.g., R$^1$ and R$^2$) are hydrogen atoms with the remaining two of R$^1$, R$^2$, R$^3$, and R$^4$ (e.g., R$^3$ and R$^4$) being selected from hydrocarbon groups and heteroatom-containing functional groups. Some particular hydrocarbon groups considered herein for R$^1$, R$^2$, R$^3$, and R$^4$ include methyl, ethyl, n-propyl, isopropyl, n-butyl, isobutyl, sec-butyl, t-butyl, phenyl, and benzyl groups. Some particular heteroatom-containing functional groups considered herein for R$^1$, R$^2$, R$^3$, and R$^4$ include halogen atom (e.g., F, Cl, Br, and I), carboxylate (e.g., —COOH, —COOR, —COO$^-$M$^+$, wherein M+ is a cationic species, such as a metal or ammonium cation), hydroxy (OH), alkoxy (OR), ether (e.g., —$CH_2CH_2$—OR), cyano, amino (e.g., —$NH_2$, —NHR, —$NR_2$, —$NR_3^+$, —$CH_2CH_2NH_2$, —$CH_2CH_2NHR$, —$CH_2CH_2NR_2$, or —$NRCH_2CH_2NH_2$), amido (e.g., —C(O)$NH_2$, —C(O)NHR, —C(O)$NR_2$, —C(O)$NR_3^+$), imino (e.g., —CH=NH, —CR=NH, —CH=NR, or —CR=NR), oximo (e.g., —CH=N—OH or —CR=N—OH), and amidoxime (e.g., —C($NH_2$)=N—OH, —C(NHR)=N—OH, or —C($NR_2$)=N—OH), as well as hydrocarbon groups (particularly, methyl, ethyl, propyl, or butyl groups) substituted once, twice, three, or more times with any of the foregoing heteroatom-containing functional groups, including any of the heterocyclic groups (e.g., pyridine) described above. Some particular examples of polyvinyl polymer grafts include polyethylene, polypropylene, polybutadiene, polyisoprene, polyvinylchloride (PVC), polyvinylidene chloride, polyvinylfluoride, polyvinylidene fluoride, polyvinylacetate, polyacrylate (salt), polyacrylic acid, polymethylacrylate (PMA), polymethylmethacrylate (PMMA), polyacrylamide, polystyrene, polycyanoacrylate, polyacrolein, poly(4-hydroxybutyl acrylate), polyvinylalcohol, polyvinylamine, polyvinylpyridine, polyvinylpyrrolidone, polyvinylacetate, and polyvinylphenol, as well as copolymers thereof.

In some embodiments, two of $R^1$, $R^2$, $R^3$, and $R^4$ (e.g., $R^2$ and $R^4$) can be crosslinked, either within a polymeric unit n (as in polybutyral or polycyclopentene) or between polymeric units to form a cyclic group. In yet other embodiments, the polyvinyl polymer graft shown in Formula (1) can include a level of unsaturation by including a carbon-carbon double bond between the shown carbon atoms (in which case two of $R^1$, $R^2$, $R^3$, and $R^4$ are removed from the formula to form a double bond) or by including a carbon-carbon double bond between carbon atoms of adjacent units (in which case one of $R^1$, $R^2$, $R^3$, and $R^4$ from one unit and one of $R^1$, $R^2$, $R^3$, and $R^4$ from another unit are removed from the formula to form a double bond between adjacent units).

The mesoporous carbon scaffold can have any composition and structure that is composed completely (i.e., 100 wt %) or substantially (e.g., 85, 90, 95, 98, or 99 wt %) of elemental carbon and has mesopores. Mesoporous carbon compositions and their methods of preparation are well known in the art, and all such mesoporous carbon compositions are considered herein. The term "carbon" used herein refers to any form of carbon, including amorphous, graphitic, crystalline, and semi-crystalline forms of carbon. An element other than carbon may be included, generally in a dopant amount, such as an amount of up to or less than 10,000, 5,000, 1,000, 500, or 100 ppm. The element other than carbon can be, for example, nitrogen, boron, oxygen, sulfur, phosphorus, silicon, or germanium, or a combination thereof.

As used herein and as understood in the art, the terms "mesopores" and "mesoporous" refer to pores having a size (i.e., pore diameter or pore size) of at least or above 2 nm and up to or less than 50 nm, i.e., "between 2 and 50 nm", or "in the range of 2-50 nm". In different embodiments, the mesopores have a size of precisely, about, at least, above, up to, or less than, for example, 3 nm, 4 nm, 5 nm, 6 nm, 7 nm, 8 nm, 9 nm, 10 nm, 11 nm, 12 nm, 15 nm, 20 nm, 25 nm, 30 nm, 35 nm, 40 nm, 45 nm, or 50 nm, or a particular size, or a variation of sizes, within a range bounded by any two of the foregoing exemplary values, or between 2 nm and any of the foregoing exemplary values.

The mesopores, and other pores, are generally circular or oval-shaped. For circular or substantially circular pores, the pore size refers to the diameter of the pore. For pores that are substantially unsymmetrical or irregularly shaped, the pore size generally refers to either the average of the pore dimensions for a particular pore, or to the average or longest dimension of such pores averaged over a population of such pores.

In one set of embodiments, a single distribution of mesopores is present in the mesoporous carbon, which may refer to either the precursor mesoporous carbon (before functionalization) or to the functionalized mesoporous carbon composition. A distribution (or "mode") of pores is generally defined by a single pore size of maximum (peak) pore volume concentration. Alternatively, the mesoporous carbon may have a bimodal, trimodal, or higher multimodal mesopore size distribution, which can be identified by the presence of, respectively, two, three, or a higher number of peak mesopore volume concentrations associated with, respectively, one, two, three, or a higher number of individual mesopore size distributions bounded on each end by a minimum mesopore size and a maximum mesopore size. The pore size distributions can be overlapping or non-overlapping. For example, the mesoporous carbon can include a monomodal, bimodal, trimodal, or higher multimodal mesopore size distribution, wherein each mesopore size distribution is bounded by a minimum mesopore size and maximum mesopore size selected from 2 nm, 3 nm, 4 nm, nm, 6 nm, 7 nm, 8 nm, 9 nm, 10 nm, 12 nm, 15 nm, 20 nm, 25 nm, 30 nm, 35 nm, 40 nm, 45 nm, and 50 nm. Any of the exemplary mesopore sizes provided above can also be taken as a pore size of peak pore volume concentration associated with a particular pore size distribution.

Typically, micropores (i.e., pore sizes less than 2 nm) are also present in the mesoporous carbon composite. In different embodiments, the micropores have a size of precisely, about, up to, or less than, for example, 0.5, 0.6, 0.7, 0.8, 0.9, 1.0, 1.2, 1.5, or 1.8 nm, or a particular size, or a variation of sizes, within a range bounded by any two of these values. When micropores are present, the mesoporous carbon can have a distribution of pore sizes in a range bounded by any of the foregoing micropore sizes and any of the foregoing mesopore sizes. In some embodiments, micropores may be desirable, whereas in other embodiments, micropores may be not desirable. For example, micropores can be beneficial in some applications where a significantly increased surface area is desired (e.g., in gas adsorption), but may be undesirable in the filtration of liquids due to impractical flow rates. Generally, for purposes of the instant invention, the pore volume attributed to micropores is preferably no more than (or less than) 50% of the total pore volume, particularly since micropores are prone to clogging by the grafting process described herein, and may also be disadvantageous if the mesoporous carbon is to be applied as a filtration medium. In different embodiments, the pore volume attributed to micropores is about, up to, less than, at least, or above, for example, 1%, 2%, 5%, 10%, 15%, 20%, 25%, 30%, 35%, 40%, or 45% of the total pore volume, or a pore volume within a range bounded by any two of the foregoing values. The pore volume due to micropores is also desirably less than the pore volume due to mesopores (i.e., pore volume due to mesopores is desirably more than the pore volume due to micropores). In different embodiments, the percent micropore volume with respect to the sum of micropore and mesopore volumes is any of the pore volume values up to or less than 50% provided above. In some embodiments, the mesoporous carbon may possess a substantial absence of micropores. By a "substantial absence" of micropores is generally meant that up to or less than 1%, 0.5%, or 0.1% of the total pore volume, or none of the pore volume, can be attributed to the presence of micropores.

In some embodiments, macropores are also present in the mesoporous carbon. In certain embodiments, particularly when the functionalized mesoporous carbon is to be used for metal absorption or in a liquid flow separation process, the presence of macropores can be desirable. Generally, the macropores considered herein have a size greater than 50 nm and up to or less than 1 micron (1 μm). In different embodiments, the macropores have a size of precisely, about, at least, greater than, up to, or less than, for example, 55 nm, 60 nm, 65 nm, 70 nm, 75 nm, 80 nm, 85 nm, 90 nm, 95 nm, 100 nm, 110 nm, 120 nm, 130 nm, 140 nm, 150 nm, 160 nm, 170 nm, 180 nm, 190 nm, 200 nm, 225 nm, 250 nm, 275 nm, 300 nm, 325 nm, 350 nm, 375 nm, 400 nm, 425 nm, 450 nm, 475 nm, or 500 nm, or a particular size, or a variation of sizes, within a range bounded by any two of the foregoing values. When macropores are present, the mesoporous carbon can have a distribution of pore sizes in a range bounded by any of the disclosed mesopore sizes and any of the foregoing macropore sizes, or between any of the disclosed micropore sizes and any of the foregoing macropore sizes. In different embodiments, the pore volume attributed to macropores is about, up to, less than, at least, or above, for example, 1%, 2%, 5%, 10%, 15%, 20%, 25%, 30%, 35%, 40%, 45%, or 50% of the total pore volume, or a pore volume within a range bounded by any two of the foregoing values. Any of the foregoing values may also be taken as the percent macropore volume with respect to the sum of macropore and mesopore volumes. In some embodiments, the mesoporous carbon may possess a substantial absence of macropores. By a "substantial absence" of macropores is generally meant that up to or less than 1%, 0.5%, or 0.1% of the total pore volume, or none of the pore volume, can be attributed to the presence of macropores.

In some embodiments, the mesoporous carbon composite contains only mesopores (i.e., 100% pore volume attributed to mesopores), while in other embodiments, the mesoporous carbon composite includes mesopores and micropores, or mesopores and macropores, or a combination of mesopores, micropores, and macropores. When mesopores are in combination with micropores and/or macropores, the percent pore volume of each pore size range can be any suitable amount, e.g., precisely, about, at least, up to, or less than 1%, 2%, 5%, 10%, 15%, 20%, 25%, 30%, 35%, 40%, 45%, 50%, 55%, 60%, 65%, 70%, 75%, 80%, 85%, 90%, 95%, 98%, or 99% percent pore volume, wherein it is understood that the total percent pore volume sums to 100%. Similarly, particular pore size sub-ranges within the mesopore size range (or within the micropore or macropore size range, if present) can have their own percent pore volumes, such as any of those exemplified above.

The pores of the mesoporous carbon can also possess a level of uniformity, generally either in pore diameter, pore shape, and/or pore interspacing. In particular embodiments, the pores of the mesoporous carbon may possess an average pore size corresponding to any of the pore sizes exemplified above, subject to a degree of variation of no more than, for example, ±10 nm, ±8 nm, ±6, nm, ±5 nm, ±4 nm, ±3 nm, ±2 nm, ±1 nm, or ±0.5 nm. In some embodiments, all of the pores are substantially uniform in size, while in other embodiments, a portion of the pores (e.g., the mesopores or the macropores) are substantially uniform in size. The mesopores (and/or micropores and/or macropores) may also be arranged relative to each other with a certain degree of order, i.e., in a patterned or ordered arrangement. Some examples of ordered arrangements include a hexagonal or cubic arrangement.

The pores can have any suitable wall thickness. For example, in different embodiments, the wall thickness can be precisely, about, at least, or less than, for example, 1 nm, 2 nm, 3 nm, 4 nm, 5 nm, 6 nm, 7 nm, 8 nm, 9 nm, 10 nm, 11 nm, 12 nm, 15 nm, 18 nm, 20 nm, 25 nm, 30 nm, 40 nm, 50 nm, 60 nm, 70 nm, 80 nm, 90 nm, 100 nm, 125 nm, 150 nm, 175 nm, 200 nm, 250 nm, 300 nm, 350 nm, 400 nm, 450 nm, or 500 nm, or a wall thickness within a range bounded by any two of these values. The foregoing exemplary wall thicknesses can be for all pores, or for a portion of the pores, e.g., only for mesopores, macropores, or micropores.

The mesoporous carbon may possess a BET surface area of about or at least, for example, 50, 100, 200, 300, 400, 450, 500, 550, 600, 650, 700, 750, 800, 900, 1000, 1500, 1800, 2000, 2200, 2500, 2800, or 3000 $m^2/g$, or a surface area within a range bounded by any two of these values. The mesoporous carbon may also possess a total pore volume of precisely, about, or at least, for example, 0.2 $cm^3/g$, 0.3 $cm^3/g$, 0.4 $cm^3/g$, 0.5 $cm^3/g$, 0.6 $cm^3/g$, 0.7 $cm^3/g$, 0.8 $cm^3/g$, 0.9 $cm^3/g$, 1.0 $cm^3/g$, 1.2 $cm^3/g$, 1.5 $cm^3/g$, 1.8 $cm^3/g$, 2 $cm^3/g$, 2.2 $cm^3/g$, 2.5 $cm^3/g$, 3.0 $cm^3/g$, 3.5 $cm^3/g$, 4.0 $cm^3/g$, 4.5 $cm^3/g$, 5.0 $cm^3/g$, 5.5 $cm^3/g$, or 6.0 $cm^3/g$, or a pore volume within a range bounded by any two of these values.

The mesoporous carbon material (either before or after functionalization) can be in any suitable form, e.g., as particles or fibers, depending on the application. The particles can be nanoparticles, microparticles, or macroscopic particles (e.g., in the millimeter size range). The particles can have a uniform or average size of precisely, about, up to, or less than, for example, 1 nm, 2 nm, 5 nm, 10 nm, 20 nm, 30 nm, 40 nm, 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, or 950 nm, or a size within a range bounded by any two of the foregoing values, or between any of the foregoing values and less than or up to 1 micron. The exemplary sizes given above for nanoparticles may refer to primary or secondary (agglomerated) particle sizes, except that for purposes of the instant invention a secondary particle size remains under 1 micron. Particularly when any of the exemplary sizes provided above refer to an average size, there is the possibility that a minor portion (i.e., less than 1, 2, or 5% by total weight) of carbon particles having a size greater than 1 micron may be present. In embodiments where less than all three size dimensions are in the nanoscale, the remaining one or two size dimensions can have a size up to or less than, for example, 2 microns, 5 microns, 10 microns, 25 microns, 50 microns, 100 microns, 250 microns, 500 microns, or 1000 microns (1 mm).

In some embodiments, the mesoporous carbon is in the form of a film. The film can have any suitable thickness, typically no more than 5 millimeters (5 mm). In different embodiments, the film may have a thickness of precisely, about, up to, at least, or less than, for example, 5 nm, 10 nm, 20 nm, 30 nm, 40 nm, 50 nm, 100 nm, 200 nm, 300 nm, 400 nm, 500 nm, 600 nm, 700 nm, 800 nm, 900 nm, 1.0 μm, 1.2 μm, 1.5 μm, 2.0 μm, 2.5 μm, 3.0 μm, 4.0 μm, 5.0 μm, 10 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, 500 μm, 600 μm, 700 μm, 800 μm, 900 μm, or 1000 μm, or a thickness within a range bounded by any two of these values. The film may also desirably function as part of a layered composite material, wherein the mesoporous carbon composite film either overlays, underlies, or is sandwiched between one or more layers of another material, wherein the one or more other layers can be useful for such applications as capacitors, batteries (e.g., lithium-ion batteries), filtration media, catalysts, or an energy storage or conversion device. The one or more layers of another material may be porous or non-porous, and can be composed of, for example, a ceramic (e.g., silica, alumina, or aluminosilicate), paper, plastic, graphite, a metal oxide, metal sulfide, metal selenide, metal telluride, metal nitride, metal phosphide, or an organic, inorganic, or hybrid polymer, or combination thereof, depending on the particular application. In particular embodiments, the porous carbon film functions as a coating on an electrically-conducting substrate suitable as an electrode. In further particular embodiments, the electrically-conducting substrate is, or includes, a carbon material, such as graphite. In other embodiments, the porous carbon film is monolithic (i.e., not disposed on a substrate).

The precursor mesoporous carbon can be produced by any method known in the art, including the so-called "hard template method" and "soft template method". Reference is made to C. Liang, et al., *Angew. Chem. Int. Ed.*, 47, 3696-3717 (2008) and J. Lee et al., *Adv. Mater.*, 18, 1-22 (2006), which describe the two processes in detail, and which are herein incorporated by reference in their entirety.

In typical embodiments of the "hard template" method, mesoporous carbon is synthesized by doping a sacrificial silica scaffold (or other sacrificial material) with a carbon precursor followed by carbonization of the precursor and subsequent removal of the silica (or other) scaffold. Reference is made to Ryoo, R., et al., *J. Phys. Chem. B*, 103, 7743-7746 (1999); Y. Korenblit, et al., vol. 4, no. 3, 1337-1344 (2010); and M. Kruk et al., *Microporous and Mesoporous Materials*, 102, 178-187 (2007), all of which are representative of the hard template process, and which are herein incorporated by reference in their entirety.

By the "soft template" method, mesoporous carbon is generally synthesized by crosslinking a phenolic compound in the presence of a crosslinking agent (typically, an aldehyde, such as formaldehyde) and a sacrificial non-ionic surfactant (typically an amphiphilic block copolymer that does not have a char yield), followed by pyrolysis, which leads to the volatilization of the surfactant and carbonization of the crosslinked phenolic resin in the same step. Reference is made to U.S. Pat. No. 8,114,510; U.S. Application Pub. No. 2011/0229401 and 2012/0234695; Wang et al., *Langmuir*, 24 (14), pp. 7500-7505, 2008; C. Liang et al., *J. Am. Chem. Soc.*, 128, 5316-5317 (2006); C. Liang et al., *Angew. Chem. Int. Ed.*, 43, 5785-5789 (2004); C. Liu et al., *Chem. Commun.*, 757-759 (2007); S. Tanaka, et al., *Chem. Commun.*, 2125-2127 (2005); Y. Meng, et al., *Angew. Chem. Int. Ed.*, 44, 2-8 (2005); F. Zhang et al., *J. Am. Chem. Soc.*, 127, 13508-13509 (2005); Y. Huang et al., *Chem. Asian J.*, 2, 1282-1289 (2007); P. F. Fulvio et al., *Adv. Funct. Mater.*, 21, 2208-2215 (2011); and B. Guo et al., *Adv. Mater.*, 23, 4661-4666 (2011), all of which are representative of the soft template method, and which are herein incorporated by reference in their entirety. The key role of the surfactant is to provide an ordered structural arrangement of the phenolic precursor, i.e., by phase separation and hydrogen bonding. Crosslinking between the precursor and crosslinker stabilizes the morphology, which imparts a mesoporous structure into the carbon structure.

In typical embodiments of the soft template method, a precursor composition is subjected to a curing step followed by a carbonization step to produce a mesoporous carbon, which herein serves as a precursor to the functionalized mesoporous carbon. The precursor composition for the mesoporous carbon typically includes at least the following components: (i) a templating component containing one or more block copolymers, (ii) one or more phenolic compounds or materials (i.e., "phenolic component"), (iii) one or more crosslinkable aldehyde compounds or materials (i.e., "aldehyde component"), and (iv) an acid or base catalyst. If desired, conductive carbon nanoparticles may also be included in the precursor composition. The resulting polymer precursor (i.e., after polymerization and crosslinking of phenolic and aldehyde components) functions as a carbon precursor, which is converted to a mesoporous carbon during a carbonization step. In contrast, the templating component (i.e., block copolymer) functions to organize the precursor materials in an ordered (i.e., patterned) arrangement before the carbonization step. During carbonization, the block copolymer is generally completely volatized into gaseous byproducts, and thereby, generally does not contribute to formation of the solid carbon matrix. However, the volatile gases produced from the block copolymer serve the important role of creating mesopores (and sometimes micropores) in the carbon matrix during the carbonization step. During carbonization, the carbon precursor components (i.e., phenol and aldehyde components), along with templating component, together produce the mesoporous carbon matrix.

The precursor mesoporous carbon, produced as above, can also be pre-functionalized (i.e., before the graft functionalization described herein), if desired, by methods known in the art for functionalizing carbon or graphite materials. For example, the precursor mesoporous carbon may be nitrogenated, fluorinated, or oxygenated by methods known in the art. The precursor mesoporous carbon may be nitrogenated, fluorinated, or oxygenated, by, for example, exposure of the carbon, either during or after the carbonization process, to, respectively, ammonia, fluorine gas, or oxygen under suitably reactive conditions. In the particular case of fluorination, the carbon material is typically placed in contact with fluorine gas for a period of several minutes (e.g., 10 minutes) up to several days at a temperature within 20° C. to 500° C., wherein the time and temperature, among other factors, are selected based on the degree of fluorination desired. For example, a reaction time of about 5 hours at ambient temperature (e.g., 15-30° C.) typically results in fluorination of about 10% of the total carbon; in comparison, fluorination conducted at about 500° C. for two days results in about 100% fluorination of the total carbon. In particular embodiments, the degree of nitrogenation, fluorination, or oxygenation can be about or at least 1%, 2%, 5%, 10%, 20%, 30%, 40%, 50%, 60%, 70%, 80%, 90%, 95%, or 100%, or a range between any two of these values.

In some embodiments, the precursor mesoporous carbon, before the grafting functionalization described herein, is activated. The activation can be any of the known activation methods of the art. In a first embodiment, the precursor mesoporous carbon is activated by exposure to a concentrated strong acid, such as nitric acid, which introduces oxygen-bearing functionalities onto the mesoporous carbon (reference is made to Chen et al., *Journal of Colloid and Interface Science*, 280 (1), 91-97 (2004), the contents of which are incorporated herein by reference in its entirety). In a second embodiment, the precursor mesoporous carbon is activated by exposure to a concentrated base, such as potassium hydroxide (reference is made to Wang et al., *Journal of Materials Chemistry*, 20, 4602-4608 (2010)). In the concentrated base method, a physical mixture of the mesoporous carbon is prepared with a solid base, such as potassium hydroxide, which is then heated to a set temperature for a specific amount of time under inert gas (e.g., nitrogen or argon) followed by acid washing and drying. In a third embodiment, the precursor mesoporous carbon is activated by treatment with carbon dioxide and/or water (reference is made to Gorka et al., *Carbon*, 49(1), 154-160 (2011)). In carbon dioxide and/or water activation, the mesoporous carbon powder is heated under an inert gas (i.e. nitrogen or argon) atmosphere, generally gradually by a temperature ramping rate, to a specified temperature (e.g., 850° C.) at which point the gas is switched to carbon dioxide and/or water (or steam) for a specified amount of time (typically 3-5 hours) then switched back to the inert gas for cooling to room temperature (typically, 18-30° C., or about 25° C.) to prevent further oxidative activation of the carbon powder.

In another aspect, the invention is directed to a method for fabricating the functionalized mesoporous carbon composition described above. In the method, a reaction medium is provided that includes (i) a precursor mesoporous carbon, as described above, (ii) vinyl monomer, (iii) polymerization initiator (i.e., "initiator"), and (iv) liquid solvent. The at least four aforesaid components are generally combined, either in parts or at once, and mixed by suitable means to form the reaction medium, which may be a slurry, emulsion, or solution. The reaction medium is sonicated at sufficient power to result in grafting and polymerization of the vinyl monomer into mesopores of the precursor mesoporous carbon to produce the functionalized mesoporous carbon composition.

The vinyl monomer is any molecule containing at least one carbon-carbon double bond and that can polymerize in the presence of an initiator and suitable polymerization conditions. In some embodiments, the term "vinyl monomer" indicates the presence of only one vinyl monomer species. In other embodiments, the term "vinyl monomer" includes two or more compositionally distinct vinyl monomer species.

In particular embodiments, the vinyl monomer has the general formula:

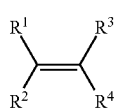

(2)

In Formula (2), $R^1$, $R^2$, $R^3$, and $R^4$ are as described above, i.e., independently selected from hydrogen atom, hydrocarbon groups having at least 1 and up to 12 carbon atoms, and heteroatom-containing groups comprising at least one heteroatom, particularly those selected from nitrogen, oxygen, sulfur, and phosphorus. All of the general and specific embodiments provided for Formula (1) above apply to Formula (2) herein.

In a first particular set of embodiments of Formula (2), all of $R^1$, $R^2$, $R^3$, and $R^4$ are hydrogen atoms. In a second particular set of embodiments of Formula (2), three of $R^1$, $R^2$, $R^3$, and $R^4$ (e.g., $R^1$, $R^2$, and $R^4$) are hydrogen atoms with the remaining one of $R^1$, $R^2$, $R^3$, and $R^4$ being a hydrocarbon group or heteroatom-containing functional group. In a third particular set of embodiments of Formula (2), two of $R^1$, $R^2$, $R^3$, and $R^4$ (e.g., $R^1$ and $R^2$) are hydrogen atoms with the remaining two of $R^1$, $R^2$, $R^3$, and $R^4$ (e.g., $R^3$ and $R^4$) being selected from hydrocarbon groups and heteroatom-containing functional groups. Some particular hydrocarbon groups considered herein for $R^1$, $R^2$, $R^3$, and $R^4$ include methyl, ethyl, n-propyl, isopropyl, n-butyl, isobutyl, sec-butyl, t-butyl, phenyl, and benzyl groups. Some particular heteroatom-containing functional groups considered herein for $R^1$, $R^2$, $R^3$, and $R^4$ include halogen atom (e.g., F, Cl, Br, and I), carboxylate (e.g., —COOH, —COOR, —COO$^-$M$^+$, wherein M$^+$ is a cationic species, such as a metal or ammonium cation), hydroxy (OH), alkoxy (OR), ether (e.g., —CH$_2$CH$_2$—OR), cyano, amino (e.g., —NH$_2$, —NHR, —NR$_2$, —NR$_3^+$, —CH$_2$CH$_2$NH$_2$, —CH$_2$CH$_2$NHR, —CH$_2$CH$_2$NR$_2$, or —NRCH$_2$CH$_2$NHR), amido (e.g., —C(O)NH$_2$, —C(O)NHR, —C(O)NR$_2$, —C(O)NR$_3^+$), imino (e.g., —CH=NH, —CR=NH, —CH=NR, or —CR=NR), oximo (e.g., —CH=N—OH or —CR=N—OH), and amidoxime (e.g., —C(NH$_2$)=N—OH, —C(NHR)=N—OH, or —C(NR$_2$)=N—OH), as well as hydrocarbon groups (particularly, methyl, ethyl, propyl, or butyl groups) substituted once, twice, three times, or more with any of the foregoing heteroatom-containing functional groups, including any of the heterocyclic groups (e.g., pyridine) described above.

In some embodiments, any of the above heteroatom-containing functional groups are not originally present on the vinyl monomer, but may be included after the vinyl monomer has been polymerized. In the latter case, the vinyl monomer typically includes a reactive group or a transformable group for at least one of $R^1$, $R^2$, $R^3$, and $R^4$, wherein the reactive or transformable group remains attached after polymerization of the vinyl monomer, and is available for further reaction to produce a final heteroatom-containing functional group. For example, at least one of $R^1$, $R^2$, $R^3$, and $R^4$ may be an epoxy-containing group (e.g., a glycidyl group), as found in glycidyl methacrylate; the epoxy-containing vinyl monomer is polymerized and grafted onto the mesoporous carbon, and the epoxy groups on the polymer graft subsequently reacted with a bifunctional epoxy-reactive molecule, e.g., a diamine (e.g., ethylenediamine) or an amino-nitrile (e.g., 2-aminoacetonitrile), to provide an amino-capped or nitrile-capped graft, respectively, on the mesoporous carbon. If desired, the modified endcapped functional group may also be further reacted or transformed to form a different functional group. For example, an amino group or nitrile group may be reacted with hydroxylamine to form, respectively, an oxime or amidoxime group, or the amino group may be reacted with ethylene oxide (to produce a polyethylene oxide graft) or with a bifunctional amine-reactive group, such as an epoxy-containing or succinic anhydride group (e.g., epoxidized or anhydride form of a siloxane, fluorophore, polyethyleneoxide (PEG), or bisphenol A).

Some particular examples of vinyl monomers include ethylene, propylene, n-butene, n-pentene, n-hexene, butadiene, isoprene, vinylchloride, vinylidene chloride, vinylfluoride, vinylidene fluoride, vinylacetate, acrylate salt (e.g., sodium acrylate or ammonium acrylate), acrylic acid, methacrylate salt (e.g., sodium methacrylate or ammonium methacrylate), methylacrylate, methylmethacrylate, acrylamide, styrene, cyanoacrylate, acrolein, glycidyl acrylate, glycidyl methacrylate, 4-hydroxybutyl acrylate, vinylamine, 2-vinylpyridine, 4-vinylpyridine, vinylpyrrolidone, 2-vinylpyrrole, 3-vinylpyrrole, 2-vinylaniline, 4-vinylaniline, vinylacetate, 4-vinylphenol, 1-amino-3-butene, 1-amino-4-pentene, 1-hydroxy-3-butene, 1-hydroxy-4-pentene, methyl vinyl ether, divinyl ether, cyclic vinyl monomers (e.g., cyclopentene or norbornene), silicon-containing vinyl monomers (e.g., allyltrimethoxysilane, vinyltriethoxysilane, 7-octenyltrimethoxysilane, 10-undecenyltrimethoxysilane, methacryloxypropyltriethoxysilane, 1-sila-3-cyclopentene, or divinyltetramethyldisiloxane), phosphorus-containing vinyl monomers (e.g., diphenyl(4-vinylphenyl)phosphine or diethyl vinyl phosphite), sulfur-containing vinyl monomers (e.g., 2-vinylthiophene or 3-vinylthiophene), and boron-containing vinyl monomers (e.g., difluoro(vinyl)borane, dichloro(vinyl)borane, dibromo(vinyl)borane, chlorodivinylborane, trivinylborane, allylborane, or aminovinylborane), as well as mixtures thereof. Typically, the vinyl monomer is a liquid or a solid, wherein the liquid or solid preferably dissolves in the reaction medium. However, the vinyl monomer may, in some embodiments, be a gas (e.g., ethylene or propylene), in which case the gaseous vinyl monomer can be included in the reaction medium by bubbling and/or dissolution into the liquid medium with the aid of a solubilizing agent, such as a co-solvent.

In a first set of particular embodiments, at least one of $R^1$, $R^2$, $R^3$, and $R^4$ is or includes a nitrile group, which may or may not bind to a metal ion, depending on the metal ion and other factors. In a second set of particular embodiments, at least one of $R^1$, $R^2$, $R^3$, and $R^4$ is or includes a heteroatom-containing functional group that can bind to metal ions. The at least one heteroatom-containing functional group may be, for example, a carboxylate, keto, aldo, amino, imino, amido, oxime, or amidoxime group. In a third set of particular embodiments, at least one of $R^1$, $R^2$, $R^3$, and $R^4$ is or includes a negatively-charged group, such as a sulfonate or carboxylate group. In a fourth set of particular embodiments, at least one of $R^1$, $R^2$, $R^3$, and $R^4$ is or includes an unsubstituted hydrocarbon group having at least four carbon atoms.

The initiator can be any of the thermal radical initiators or photoinitiators known in the art useful in the polymerization of vinyl monomers. The initiator can be, for example, a peroxide, typically an organic peroxide (e.g., di-t-butyl peroxide, benzoyl peroxide (BPO), or methyl ethyl ketone peroxide), or an azo compound (e.g., azobisisobutyronitrile (AIBN), 4,4'-azobis(4-cyanovaleric acid), 1,1'-azobis(cyclohexanecarbonitrile) (ABCN), or 2,2'-azobis(2-methylpropionamidine)dihydrochloride), or an acetophenone (e.g., 2,2-dimethoxy-2-phenylacetophenone), or a persulfate (e.g., potassium persulfate), all of which are well known and widely available in the art.

The solvent included in the reaction medium can be any one or more solvents known in the art. In some embodiments, a single solvent is used, whereas in other embodiments, a mixture of two or more solvents is used, generally in a single phase. In a first embodiment, the solvent is a polar protic liquid. Some examples of polar protic liquids include water, the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). In a second embodiment, the solvent is a polar non-protic liquid. Some examples of polar non-protic liquids include the nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), dialkylcarbonates (e.g., ethylene carbonate, dimethylcarbonate, diethylcarbonate), organoethers (e.g., diethyl ether, tetrahydrofuran, and dioxane), hexamethylphosphoramide (HMPA), N-methylpyrrolidone (NMP), 1,3-dimethyl-3,4,5,6-tetrahydro-2(1H)-pyrimidinone (DMPU), and propylene glycol methyl ether acetate (PGMEA). In a third embodiment, the solvent is a non-polar liquid. Some examples of non-polar liquids include the liquid hydrocarbons, such as a pentane (e.g., n-pentane or isopentane), hexane, heptane, octane, pentene, hexene, heptene, octene, benzene, toluene, xylene, or supercritical carbon dioxide.

The reaction medium containing the precursor mesoporous carbon, vinyl monomer, and other components, described above, is subjected to sonication (i.e., ultrasound) of sufficient power (i.e., where cavitation occurs) to result in grafting and polymerization of the vinyl monomer into at least the mesopores of the mesoporous carbon to produce the functionalized mesoporous carbon composition. The grafting and polymerization may or may not also occur in micropores, macropores, and in non-porous regions of the mesoporous carbon. As also described above, the initially produced functionalized mesoporous carbon may be further functionalized by reaction with or decomposition of the functional groups on the initially produced functionalized mesoporous carbon.

In different embodiments, the sonication is provided at a power of precisely, about, at least, above, up to, or less than, for example, 50 W, 100 W, 150 W, 200 W, 250 W, 300 W, 350 W, 400 W, 450 W, 500 W, 550 W, 600 W, 650 W, 700 W, 750 W, or 800 W, or a power within a range bounded by any two of the foregoing power values. The sonication is also provided at any suitable frequency, such as a frequency of precisely, about, at least, above, up to, or less than, for example, 10, 15, 20, 25, 30, 40, 45, 50, 60, 70, 80, 90, or 100 kHz, or within a range bounded by any two of the foregoing frequency values.

The vinyl monomer ("monomer") may be included in any suitable ratio with respect to the precursor mesoporous carbon ("carbon"). In different embodiments, the monomer-to-carbon ratio is precisely, about, at least, above, up to, or less than, for example, 1:10, 1:5, 1:4, 1:3, 1:2, 1:1, 2:1, 3:1, 4:1, 5:1, or 10:1 by weight, or such a ratio within a range bounded by any two of the foregoing ratios. The initiator may also be included in any suitable ratio with respect to the carbon. In different embodiments, the initiator-to-carbon ratio is precisely, about, at least, above, up to, or less than, for example, 1:10, 1:5, 1:4, 1:3, 1:2, 1:1, 2:1, 3:1, 4:1, 5:1, or 10:1 by weight, or such a ratio within a range bounded by any two of the foregoing ratios. The initiator may also be included in any suitable ratio with respect to the monomer. In different embodiments, the initiator-to-monomer ratio is precisely, about, at least, above, up to, or less than, for example, 1:10, 1:5, 1:4, 1:3, 1:2, 1:1, 2:1, 3:1, 4:1, 5:1, or 10:1 by weight, or such a ratio within a range bounded by any two of the foregoing ratios.

The sonochemical grafting and polymerization process is conducted at any suitable temperature for any suitable amount of time that achieves the desired result. The temperature and time are highly dependent on such conditions as the sonication power and frequency, the solvent used, the type of monomer, and the amount, type, and weight ratio of initiator with respect to monomer and mesoporous carbon. In different embodiments, the reaction medium, during sonication, is subjected to a temperature of precisely, about, at least, above, up to, or less than, for example, 0, 10, 20, 25, 30, 35, 40, 50, 60, 70, 80, 90, 100, 110, 120, 130, 140, or 150° C., or a temperature within a range bounded by any two of the foregoing temperature values. The choice of temperature may also be dictated by the boiling point and/or decompositional temperature of the solvent used. The reaction at a selected temperature can be conducted for a time period of precisely, about, at least, greater than, up to, or less than, for example, 0.5, 1, 2, 5, 10, 12, 15, 18, 24, 30, 36, 48, 72, 84, or 96 hours, wherein it is understood that higher temperatures and sonication powers generally require shorter time periods.

The sonochemical grafting and polymerization process is typically conducted under an inert atmosphere. The inert atmosphere can be, for example, an atmosphere composed substantially (for example, at least 80, 85, 90, 95, 98, or 99%) or completely of nitrogen or a noble gas (e.g., helium or argon).

The above-described sonochemical grafting and polymerization process can typically achieve a degree of grafting (i.e., grafting yield) of at least 10%. In different embodiments, the grafting yield is at least 10, 12, 15, 18, 20, 22, 25, 28, or 30%.

In particular embodiments, the invention is directed to producing a mesoporous carbon composition that has been functionalized with amidoxime groups in at least mesopores therein. FIG. 1 is a schematic showing two different methodologies for incorporating nitrile-containing polymeric grafts (e.g., PAN) into and/or onto a mesoporous carbon, and then converting the nitrile groups into amidoxime groups by the action of hydroxylamine. In the top portion of FIG. 1, acrylonitrile monomer is reacted with a mesoporous carbon under sonication conditions in the presence of an initiator (BPO) to incorporate PAN grafts into the mesoporous carbon; the nitrile groups on the PAN grafts are the converted to amidoxime groups by reaction with hydroxylamine. In the bottom portion of FIG. 1, glycidylmethacrylate (GMA) is reacted with a mesoporous carbon under sonication conditions in the presence of an initiator to incorporate poly(GMA) grafts into the mesoporous carbon; the epoxy groups in the poly(GMA) grafts are then reacted with an amino-nitrile bifunctional group to provide nitrile-containing grafts on the mesoporous carbon, and the nitrile groups are subsequently converted to amidoxime groups by reaction with hydroxylamine. In further particular embodiments, mesoporous carbon compositions functionalized with amidoxime groups are used for adsorption of metal ions from solution, particularly metal ions selected from transition metal, lanthanide, and actinide metal ions, and more particularly, for the adsorption of uranium, particularly from seawater or wastewater.

In another aspect, the invention is directed to a method for extracting metal ions from a liquid solution containing metal ions, wherein the metal-containing liquid solution (i.e., "solution") is contacted with a functionalized mesoporous carbon composition, as described above, that contains heteroatom-containing functional groups that can bind to metal ions. The solution can be contacted in any manner that preferably maximizes the adsorption of one or more metal ions into the functionalized mesoporous carbon. The contact can be achieved by, for example, flowing the solution through the functionalized mesoporous carbon material, or by mixing the solution with a particulate form of the functionalized mesoporous carbon material. The functionalized mesoporous carbon compositions described above extract one or more metal ions from the solution by adsorbing the metal ions into functionalized pores (and optionally, onto functionalized non-porous regions) of the mesoporous carbon. The functionalized mesoporous carbon compositions described above preferably adsorb a desired metal ion in an adsorption capacity of at least 0.2 grams of metal ion per kilogram of porous carbon adsorbent. In different embodiments, the functionalized mesoporous carbon compositions described above provides an adsorption capacity of about, at least, or above 0.2, 0.5, 1, 1.5, 2, 2.5, 3, 3.5, 4, 4.5, 5, 5.5, or 6 g (metal ion)/kg (adsorbent). In some embodiments, the adsorption is selective for one or more metal ions. The adsorption can be made selective by, for example, functionalizing the mesoporous carbon with specific functional groups known to bind or chelate preferentially or only to a specific metal ion. In the latter embodiment, one or more specific types of metal ions are selectively adsorbed (e.g., at any of the adsorption capacities provided above), while one or more other metal ions are adsorbed at a lower adsorption capacity (e.g., up to or less than any of the adsorption capacities provided above) or not absorbed altogether.

The metal-containing liquid solution can be, for example, seawater or wastewater that contains metal ions. The metal ions particularly considered herein are the transition, lanthanide, and actinide metal ions. The transition metals can be selected from first-row, second-row, and third-row transition metals. Some examples of first-row transition metal ions include Sc(III), Ti(IV), V(III), V(IV), V(V), Cr(III), Cr(VI), Mn(VII), Mn(V), Mn(IV), Mn(III), Fe(II), Fe(III), Co(III), Ni(III), Cu(I), Cu(II), and Zn(II). Some examples of second-row transition metal ions include Y(III), Zr(IV), Nb(IV), Nb(V), Mo(IV), Mo(VI), Ru(IV), Ru(VIII), Rh(III), Rh(IV), Pd(II), Ag(I), and Cd(II). Some examples of third-row transition metal ions include Hf(IV), Ta(V), W(III), W(IV), W(VI), Re(IV), Re(VII), Ir(IV), Pt(II), Pt(IV), Au(III), Hg(I), and Hg(II). Some examples of lanthanide metal species include any of the elements in the Periodic Table having an atomic number of 57 to 71, e.g., La(III), Ce(III), Ce(IV), Pr(III), Nd(III), Sm(III), Eu(III), Gd(III), Tb(III), Dy(III), Ho(III), Er(III), Tm(III), Yb(III), and Lu(III). Some examples of actinide metal species include any of the elements in the Periodic Table having an atomic number of 90 to 103, i.e., ions of Th, Pa, U, Np, Pu, and Am. In some embodiments, the metal ions being adsorbed in the mesoporous carbon are alkali, alkaline earth, and/or main group metal ions. Some examples of alkali metal species include $Li^+$, $Na^+$, $K^+$, and $Rb^+$. Some examples of alkaline earth metal species include $Be^{2+}$, $Mg^{2+}$, $Ca^{2+}$, and $Sr^{2+}$. Some examples of main group metal species (e.g., cations of Group IIIA-VIIA of the Periodic Table), include $B^{3+}$, $Al^{3+}$, $Ga^{3+}$, $In^{3+}$, $Tl^{1+}$, $Tl^{3+}$, $Si^{4+}$, $Ge^{4+}$, $Sn^{2+}$, $Sn^{4+}$, $Pb^{2+}$, $Pb^{4+}$, $N^{3+}$, $P^{3+}$, $P^{5+}$, $AS^{3+}$, $As^{5+}$, $Sb^{3+}$, $Sb^{5+}$, and $Bi^{3+}$. The metal ions are generally present as salts, such as halide (e.g., fluoride, chloride, bromide, or iodide), sulfate, nitrate, carbonate, phosphate, bicarbonate, hydroxide, carboxylate (e.g., acetate), oxide, and sulfide salts of any of the foregoing metal ions. In some embodiments, any one or more of the above metals are preferentially adsorbed or are preferentially not adsorbed, or any one or more of the above metals are included in the metal-containing solution while one or more metals may be excluded.

Examples have been set forth below for the purpose of illustration and to describe certain specific embodiments of the invention. However, the scope of this invention is not to be in any way limited by the examples set forth herein.

EXAMPLES

Sonochemical Functionalization of Mesoporous Carbon with Amidoxime Groups and Use Thereof for Extraction of Uranium from Seawater Overview Increasing energy demands and uncertainty in fossil fuel-based energy sources are the main driving forces behind a resurgence of nuclear power among other alternative energy forms. The supply of uranium from terrestrial ores is limited and access can be further hindered through geopolitical activities. Alternative uranium reserves exist in the oceans, albeit in low concentrations (3.3 ppb) as the tricarbonato anion $[UO_2(CO_3)_3]^{4-}$ ((a) Davies, R. V., et al., *Nature*, 1964, 203 (495), 1110; and (b) Saito, K., et al., *Kagaku Kogaku Ronbunshu*, 1981, 7 (6), 545-548). The approximate 1.3 billion $km^3$ of water in the oceans contains a myriad of elements. Although many of the elements are in low concentrations (e.g., transition metals, lanthanides, and uranium), when combined with the vast quantity of seawater the low concentrations result in large untapped reserves. In view of rising energy demands, uranium reserves, such as seawater, nuclear fuel effluents, mine tailings, and others, have become alternative resources of interest (Rao, T. P., et al., *Talanta*, 2006, 68 (4), 1047-1064).

Extracting uranium from seawater is challenging due to its low concentration (3.3 ppb) and the large number of competing ions. Mesoporous carbon materials provide a high surface area alternative to the traditional polymeric fiber braids developed for seawater extractions, particularly for uranium extraction. In this work, sonochemical grafting and polymerization of acrylonitrile into pores of soft-templated mesoporous carbons followed by conversion of nitrile groups to amidoxime functionalities was used to prepare an effective sorbent material with a high density of binding sites. Pore blockage, often observed for free radical polymerization, leads to poor adsorbent performance. However, pore blockage has in large part been obviated by the instant methodology by the use of ultrasound during polymerization. Moreover, various parameters, such as carbon surface area, surface pre-treatment, sonication intensity, solvent system, and monomer/initiator ratios, were varied to optimize the polymerization and uranium adsorption capacity while circumventing pore blockage. The foregoing represents a significant hurdle in the functionalization of porous carbon materials. In particular embodiments, neither surface oxidation with nitric acid nor $CO_2$ activation alone were sufficient to cause significant improvement in grafting and uranium uptake. However, when coupled together, a greatly enhanced performance of the adsorbent materials was observed.

Among the many functional groups studied for uranium recovery from seawater, the amidoxime group is known to provide high loadings of uranium and a fast adsorption rate. By a conventional process, adsorbents have been prepared by conventional hydrothermal grafting of nitrile groups onto a polymer support (usually polyethylene or polypropylene fibers) and then converted to amidoxime functionalities (e.g., Omichi, H., et al., *Separation Science and Technology*, 1986, 21 (6-7), 563-574). That approach proved to be particularly effective for grafting polyacrylonitrile (PAN) with good yield on convex surfaces. However, when grafting on a concave surface (as found in pores), the risk of pore blockage increases and can adversely affect the adsorbent performance. The latter effect also depends on the amount of chelating polymer available and its accessibility for metal ions. Preliminary results studied herein indicate that the pore blockage is a critical issue: the classic free radical polymerization of PAN inside the pores of mesoporous carbons leads to a poor grafting distribution accompanied by a greatly reduced pore volume. The aforesaid issue has herein been substantially overcome by the use of the sonochemical process described above. Without being bound by theory, it is believed that the sonochemical process provides the necessary mass transport during the polymerization reaction to prevent pore blockage.

Herein is reported the sonochemical preparation of an amidoxime-functionalized mesoporous carbon sorbent for the recovery of uranium (VI) ions from seawater. The mesoporous carbon was prepared by a soft-templating process in which a phenolic resin and triblock copolymer were reacted under acidic conditions. Mild and high intensity ultrasound were employed for the polymerization of acrylonitrile to enhance its grafting yield onto the carbon surface. Optimization of the uranium capacity resulted from varying the reaction conditions, including the use of carbon materials with different pore and surface characteristics, different polymerization solvents, and by varying the relative amounts of initiator and monomer.

Preparation of Mesoporous Carbon Supports

The ordered mesoporous carbon (OMCs) materials were synthesized according to Wang et al., *Langmuir*, 24 (14), pp. 7500-7505, 2008. In order to improve the specific surface area, OMCs were subjected to a base (KOH) activation, in which the carbon-KOH mixture (1:3 ratio) was heated under flowing nitrogen at 5° C./min to 850° C. for two hours. The resulting activated mesoporous carbon was washed with deionized (DI) water followed by dilute hydrochloric acid, and then dried at 80° C. for 24 hours. Oxidation of the carbon materials was performed with concentrated nitric acid or a mixture of nitric and sulfuric acids (1:3 vol/vol ratio of nitric to sulfuric acid) for 5 hours in a standard laboratory sonication bath and then washed to neutral pH with DI water, and dried.

Grafting of Polyacrylonitrile Under Sonication and Nitrile Conversion to Amidoxime Sonochemical polymerization reactions were performed with the use of two sonication systems of different intensities. The use of a standard ultrasonic cleaning bath operating at 100 W and 42 kHz (Bransonic® 2510) is herein referred to as a "mild sonication system". The use of a sonic probe system operating at an adjustable power of 750 W maximum and 25 kHz (Vibra Cell® VCX750) is herein referred to as a "high intensity sonication".

Prior to the synthesis, 0.3 g of activated mesoporous carbon was added to 1 g of initiator (BPO) in acetone, followed by evaporation of the acetone at room temperature. For samples prepared under mild sonication with a standard laboratory sonication bath, a round bottom flask equipped with a condenser and a nitrogen purge was placed in the sonication bath and charged with 100 mL of the solvent mixture (DMF/MeOH or $EC/H_2O$), BPO-impregnated carbon, and 16.6 mL of acrylonitrile. The reaction mixture was evacuated and refilled with nitrogen three times. The polymerization was conducted under nitrogen flow and sonication for 5 hrs at 60-70° C. In the case of high intensity sonication with an ultrasonic probe, the same amounts of solvent and carbon were used with half the monomer amount. The reaction mixture was added to the sonication vessel and allowed to polymerize for two hours at 50% power (unless denoted otherwise). The final product was collected by centrifugation and washed with DMF, MeOH, and acetone, and then dried overnight at 80° C. The amidoximation reaction was performed by reacting the nitrile-functionalized mesoporous carbon with 10% hydroxylamine solution in a 50/50 solution of $H_2O$/MeOH for 72 hours at 80° C. in a closed flask. The product was then washed with water, treated with DMSO for three hours at 130° C., then washed with deionized (DI) water. The experimental details are summarized in Table 1, which includes references to the following discussion.

TABLE 1

Experimental data for the studied adsorbents

| Sample | Carbon support | Solvent system | Sonication condition: Probe (p)/Bath (b) | Notes |
|---|---|---|---|---|
| 1 | o-C | $EC/H_2O$ | b | Surface modification and porosity |
| 2 | a-C | $EC/H_2O$ | b | effect; the comparison of supports |
| 3 | a-C | $EC/H_2O$ | b | with different surface and porosity |
| 4 | oa-C | $EC/H_2O$ | b | characteristics for grafting of PAN |
| 5 | a-C | $EC/H_2O$ | p | under mild (bath) and high intensity |
| 6 | oa-C | $EC/H_2O$ | p | (probe) sonication. |
| 7 | o-C | DMF/MeOH | b | +#1&2: Solvent effect; the |

TABLE 1-continued

Experimental data for the studied adsorbents

| Sample | Carbon support | Solvent system | Sonication condition: Probe (p)/Bath (b) | Notes |
|---|---|---|---|---|
| 8 | a-C | DMF/MeOH | b | comparison of two different solvent |
| 9 | a-C | EC/H$_2$O | b | systems used for grafting PAN |
| 10 | a-C | EC/H$_2$O | b | under mild sonication. |
| 11 | oa-C | DMF/MeOH | p | +#6: Reduced amount of monomer |
| 12 | oa-C | DMF/MeOH | p | in two different solvents for grafting |
| 13 | oa-C | EC/H2O | p | PAN under high intensity sonication. |
| 14 | oa-C | EC/H$_2$O | b | +#4: Increased amount of initiator |
| 15 | oa-C | EC/H$_2$O | p | under different sonication condition. |
| 16 | oa-C | EC/H$_2$O | p | |
| 17 | oa-C | EC/H$_2$O | p | +#16: The effect of variable |
| 18 | oa-C | EC/H$_2$O | p | power on grafting PAN under |
| 19 | oa-C | EC/H$_2$O | p | high intensity sonication. |

Notation: o-C = oxidized carbon; a-C = activated carbon; oa-C = activated and oxidized carbon; EC/H$_2$O = ethylene carbonate and water mixture; DMF/MeOH = dimethylformamide and methanol mixture.

Uranium Sorption Experiments

Uranium sorption experiments were conducted using simulated seawater prepared by dissolving 17 mg of uranyl nitrate ([UO$_2$(NO$_3$)$_2$]), 25.6 g of sodium chloride (NaCl) and 193 mg of sodium bicarbonate (NaHCO$_3$) in 1 L of DI water. Next, 50 mg of amidoximated carbon sample was shaken in 50 mL of the uranium-containing solution for 24 hours, followed by filtration and quantification of the remaining uranium in solution via inductively coupled plasma optical emission spectrometry (ICP-OES) analysis.

Characterization

Nitrogen adsorption isotherms were measured at −196° C. using TriStar® 3000 volumetric adsorption analyzer (Micromeritics Instrument Corp., Norcross, Ga.). Before the adsorption measurements, the carbon powders were degassed under flowing nitrogen for two hours at 110° C. The specific surface area of the samples was calculated using the known Brunauer-Emmett-Teller (BET) method within the relative pressure range of 0.05-0.20. Pore size distributions (PSD) were calculated using the BJH algorithm for cylindrical pores according to the improved KJS method (e.g., Kruk, M., et al., *Chemistry of Materials*, 2001, 13 (10), 3169-3183) calibrated for pores up to 12 nm.

Thermogravimetric analysis (TGA) was performed on a TGA 2950® Thermogravimetric analyzer (TA Instruments) in the temperature range of 30-800° C. under flowing nitrogen.

Surface chemistry was probed by X-ray Photoelectron Spectroscopy (XPS) using a PHI 3056® spectrometer equipped with an Al Kα source (1486.6 eV). In a cryo-pumped vacuum chamber with a measurement pressure below 10$^{-8}$ Torr, high resolution scans were taken at 350 W with 23.5 eV pass energy, 0.05 eV energy step, and from 30 to 120 repeats to improve the signal to noise ratio. Survey scans were measured at 350 W with 93.9 eV pass energy, 0.3 eV energy step, and 10 repeats. The binding energies were shifted by setting the aliphatic carbon signal to 284.8 eV to account for charging.

Surface concentrations were estimated by integrating the peaks area and using standard atomic sensitivity factors supplied by the equipment manufacturer. The spectra were deconvoluted using Gaussian-Lorentzian functions and a Shirley-type background.

ICP-OES measurements of initial and final uranium concentrations were performed on an Optima 2100® DV ICP-OES system (Perlkin Elmer) at $\lambda_U$ of 367.007 nm.

Results and Discussion

A) The Effect of Surface Modification and Porosity of a Carbon Support

Three different mesoporous carbon supports were used in this study to determine how the preparation of a carbon surface prior to polymer grafting affects the grafting yield and uranium adsorption capacity. All carbons were prepared by the soft-templating method using a phenolic resin. In the first case, the carbon's surface was oxidized with concentrated nitric acid (denoted as o-C) to introduce oxygen-bearing functionalities that can facilitate grafting (e.g., Chen, Q., et al., *Journal of Colloid and Interface Science*, 2004, 280 (1), 91-97). Another carbon support was activated with CO$_2$ (denoted as a-C), as described above, to increase the specific surface area, which is suspected to have a crucial role in grafting. In the third case, previously activated carbon was treated with nitric acid (denoted as oa-C) to investigate the combined effect of surface modification and high surface area.

Figure 2A:
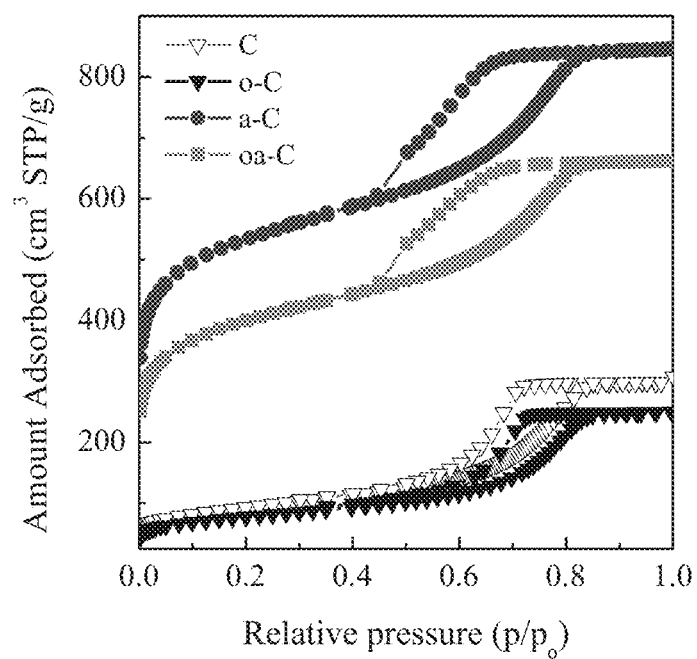
FIGS. 2(A)-2(D). Nitrogen adsorption isotherms and corresponding pore size distributions for precursor mesoporous carbon materials (FIGS. 2A, 2B) and their PAN-grafted analogues (FIGS. 2C, 2D). (o-C=oxidized carbon; a-C=activated carbon; oa-C=activated and oxidized carbon)
Figure 2B:
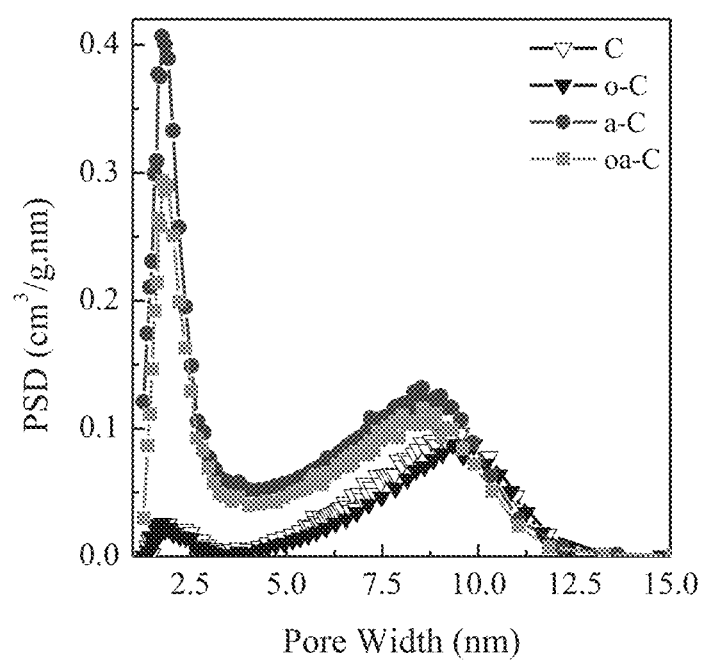

The nitrogen adsorption isotherms and corresponding pore size distributions for the parent mesoporous carbons and their grafted counterparts are presented in FIGS. 2A-2D. All samples exhibit type IV isotherms with H1-type hysteresis loops indicating the presence of a uniform array of cylindrical mesopores. As can be seen in FIG. 2A, surface oxidation of the mesoporous carbon mostly alters the low range of relative pressures (up to 0.4 p/po), while the higher range of relative pressures corresponding to mesopores remains relatively unchanged. This translates to a lower overall N$_2$ uptake, where the difference in microporosity does not exceed 25% and mesopores possessing almost identical pore size distributions with the maxima at 8.5 nm (see Table 2). The CO$_2$ activation resulted in an increased surface area and pore volume reaching 1800 m$^2$/g and 1.08 cm$^3$/g, respectively. As shown in Table 2 and FIGS. 2(A) and 2(B), the activation also caused the shift of the capillary condensation loop to lower relative pressures. Additionally, the shape of the hysteresis loop underwent some changes by being slightly larger and broader than the initial carbon. This is well displayed by the PSD curves, which clearly illustrate that the activation altered not only the finer pores, but also the mesopores in the range of 4 to 10 nm. Notably, the acid oxidation of activated mesoporous carbons decreased the microporosity while leaving the mesopore structure nearly intact. The latter further confirms the exceptional stability of the ordered mesoporous carbons obtained by soft-templating.

TABLE 2

Structural and adsorption properties of PAN-grafted carbons[a]

| Sample | $S_{BET}$ (m²/g) | $V_t$ (cm³/g) | $V_{mi}$ (cm³/g) | $V_{me}$ (cm³/g) | $w_{KJS}$ (nm) | Grafting (%) | U ads. cap. (g-U/kg-ads) |
|---|---|---|---|---|---|---|---|
| C    | 329  | 0.46 | 0.03 | 0.41 | 9.6 | —    | —    |
| o-C  | 272  | 0.38 | 0.02 | 0.35 | 9.6 | —    | —    |
| a-C  | 1857 | 1.08 | 0.42 | 0.63 | 8.5 | —    | —    |
| oa-C | 1400 | 1.02 | 0.31 | 0.53 | 8.5 | —    | —    |
| 1    | 148  | 0.22 | 0.01 | 0.21 | 9.1 | 12.0 | 0.39 |
| 2    | 1206 | 0.99 | 0.23 | 0.59 | 9.5 | 12.0 | 2.09 |
| 3    | 1094 | 0.99 | 0.23 | 0.62 | 9.3 | 16.2 | 3.11 |
| 4    | 595  | 0.50 | 0.11 | 0.33 | 7.7 | 24.0 | 4.05 |
| 5    | 1210 | 1.05 | 0.23 | 0.59 | 9.6 | 24.5 | 2.81 |
| 6    | 598  | 0.57 | 0.10 | 0.41 | 8.4 | 16.6 | 3.76 |

[a]Notation: $S_{BET}$ - BET specific surface area; $V_t$ - single-point pore volume; $V_{mi}$ - volume of fine pores (mainly micropores) obtained by integration of PSD up to 3.5 nm; $V_{me}$ - volume of mesopores obtained by integration of PSD from 4 nm to 20 nm; $w_{KJS}$ - mesopore diameter at the maximum of the PSD curve obtained by the modified KJS method; Grafting % obtained in the temperature range 110-450° C. from the TG curve recorded in nitrogen; Uranium adsorption capacity obtained from ICP-OES measurements and calculated according to the formula: U ads. cap. = {(Ci − Cf)} × {volume of solution [mL]}/{mass of adsorbent [g]}, where Ci and Cf represent the initial and final solution concentrations.

Figure 2C:
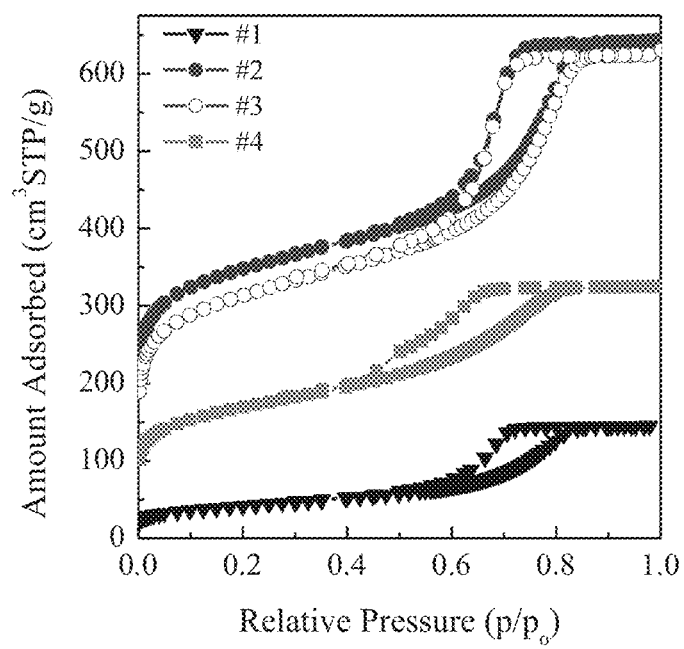
Figure 2D:
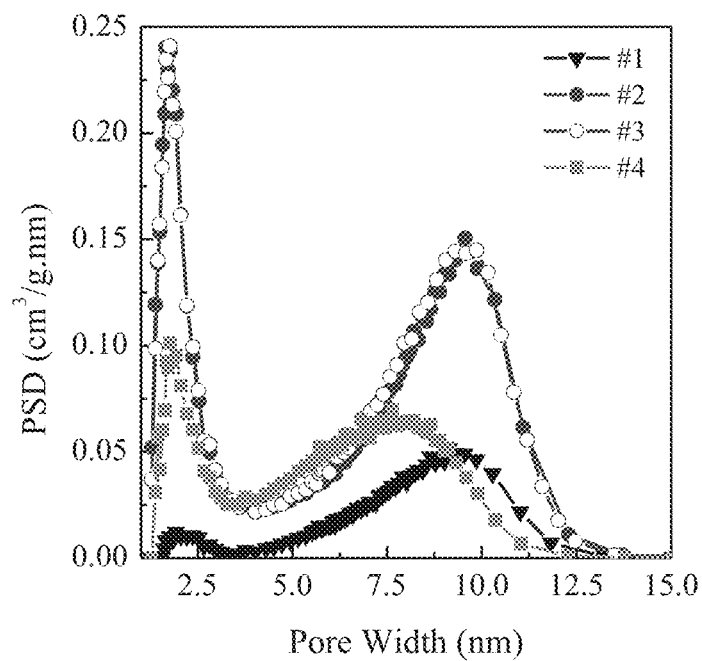

FIGS. 2(C) and 2(D) present the nitrogen adsorption isotherms and corresponding PSD curves for PAN-grafted carbons obtained under mild sonication. As expected, the adsorption parameters decreased after grafting for all samples. The drop of 35-57% in BET surface area and micropore volume strongly suggests that the vast amount of polymerization takes place in complementary pores (micropores and small mesopores up to 3.5 nm). Also, a very small decrease in the mesopore diameter further supports the aforementioned observation. Taking into account the different surface chemistry and porosity obtained by the pre-polymerization treatments, the results strongly suggest that neither the activation nor oxidation alone is primarily responsible for improving the degree of grafting. The thermogravimetric decomposition curves recorded in flowing nitrogen showed identical values of 12% for both samples (#1 & 2 in Table 2). When the total amount of solvent used in the synthesis was reduced, further improvement in grafting was observed (samples #2 & 3). However, only a combination of both activation and oxidation resulted in doubling of the grafting yield (samples #2 & 4).

Figures 3A, 3B:
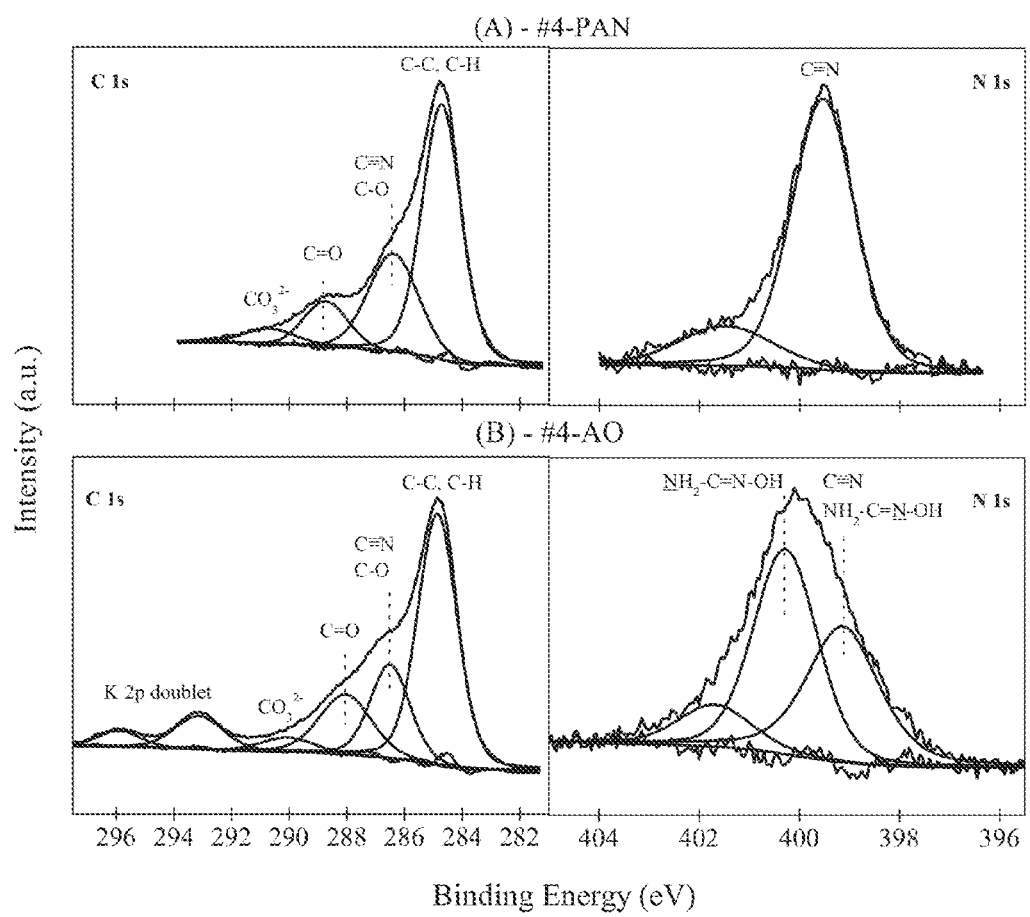
FIGS. 3(A), 3(B). C1s and N1s high resolution XPS spectra for PAN-grafted (FIG. 3A) and amidoximated (FIG. 3B) a mesoporous carbon having the characteristics shown for sample #4 in Table 2.

In addition to the thermogravimetric analysis, the functionalities of the grafted molecules were analyzed using XPS (FIGS. 3A, 3B). For the acrylonitrile-grafted sample, oxygen-surface functionalities (—OH, C—O (286.4 eV), C=O (288.5 eV), $CO_3^{2-}$ (290.6 eV)) are evidenced from the C1s and O1s (not presented) spectra, and result from the activation of carbon in $CO_2$ and acid oxidation. More importantly, the C1s and N1s spectra (left and right portions of each of FIGS. 3A and 3B) indicate the formation of the C≡N bond as characterized by a binding energy of 286.4 eV and 399.5 eV in the C1s and N1s spectra, respectively (Yu, Z. J., et al., Langmuir, 2002, 18 (26), 10221-10230). The N1s spectrum also shows a weak signal at about 401.5 eV, which is related to more oxidized N groups. In the case of the amidoxime-containing sample (FIG. 3B), apart from O functionalities similar to those found on polyacrylonitrile samples, functionalities bearing N are clearly evidenced. The N1s spectrum shows a large broadening compared to the spectrum measured on the polyacrylonitrile sample. An attempt to resolve the peak broadening is to incorporate a signal for C=N having a similar full width at half maximum as the signal measured for polyacrylonitrile. This leads to the addition of signals at 400.3 and 401.7 eV corresponding to NH₂—C=N—OH and NH₂—C=N—OH, respectively.

The N1s spectrum could also very well be fitted using a singlet at 400.0 eV attributed to NH₂—C=N—OH.

As earlier mentioned, when considering grafted organic moieties on convex surfaces, such as polymer fibers, MWCNTs, etc., a direct relationship appears to be present between the degree of grafting and metal adsorption capacity. However, in the instant case, the grafted polymer is located on the concave surface of the cylindrical mesopores and does not have the same degree of freedom. Therefore, the grafted polymer accessibility may be obstructed, thus resulting in more complex binding phenomena. The comparison of samples #1 and #2, which possess the same degree of grafting, supports this conclusion. While both contain the same amount of polymer capable of adsorbing metal ions, the PAN-grafted oxidized carbon sample exhibits poor uranium adsorption capacity compared to the non-oxidized activated carbon. This can be attributed to lower mesopore and total pore volumes. First, this may indicate a problem with mass transfer throughout the bulk of the adsorbent and possibly slow kinetics, which is a limiting factor for any adsorbent material. Second, the goal of the oxidation treatment performed before grafting was not only to facilitate uranium adsorption by creating the abundance of oxygen-containing groups but also to make the carbon's surface more hydrophilic. The results show that this treatment alone is not able to improve the performance of the adsorbent if not accompanied by proper textural properties of the surface.

The comparison of uranium adsorption capacity data obtained for samples #3 and #4 clearly indicate the importance of both previously discussed factors. Since all synthesis parameters were maintained constant except the surface treatment of the carbon supports, the importance of the oxidation step before activation in the preparation of the carbon's surface and prior to grafting is clearly observed. This simple modification doubles the degree of grafting and the uranium adsorption capacity.

Figure 4A:
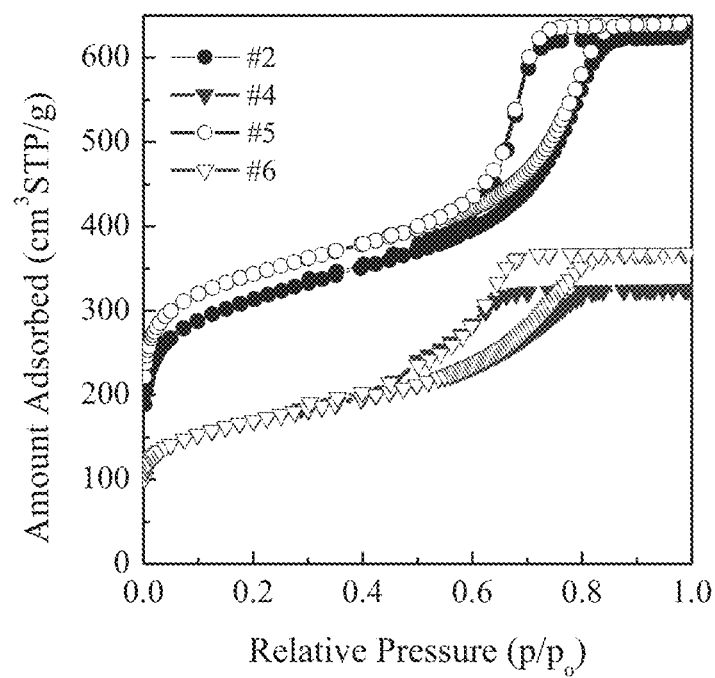
FIGS. 4(A), 4(B). Nitrogen adsorption isotherms (FIG. 4A) for PAN-grafted carbons under mild sonication (i.e., carbon samples 2 & 4) and high intensity sonication (i.e., carbon samples 5 & 6), and corresponding pore size distributions (FIG. 4B).
Figure 4B:
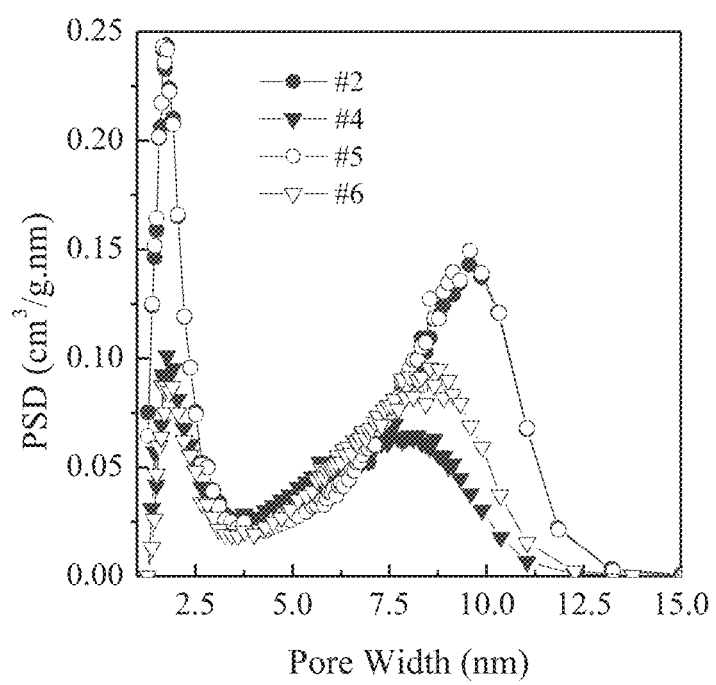

The effect of high intensity sonication (samples #5 & 6) was studied and compared with samples prepared according to the protocols for samples #2 and #4 (mild sonication). The nitrogen adsorption isotherms and corresponding pore size distributions (FIGS. 4A, 4B) for the polymer grafted activated carbons and oxidized-activated carbons synthesized under mild and high intensity sonication illustrate the textural differences between the samples. In general, the samples grafted under high intensity sonication do not differ much in terms of textural properties from their counterparts grafted under mild sonication. All adsorption parameters are in good agreement (see Table 2). More interestingly, there are some variations in the degree of grafting and uranium adsorption capacity. For samples prepared with activated carbons (samples #2 & 5), high intensity sonication led to double the amount of polymer fixed onto the pore surface of the carbons and subsequently higher metal uptake. The sorption increase is not proportional to the increase of grafting. Several factors can be attributed to this observation, including blockage of the binding sites and incomplete conversion of the nitrile groups to amidoximes. Particularly surprising results were obtained for samples grafted on oa-C carbons (samples #4 & 6), where the use of the high intensity sonic probe resulted in an opposite effect, lowering both parameters. While the degree of grafting dropped 30%, uranium adsorption capacity decreased by only 7%. The reason for this discrepancy may lie in the higher mesopore volume and the presence of slightly larger mesopores found in sample #6.

Solvent Effects

Acrylonitrile polymerization is generally facile, with polymerization occurring in almost any solvent. In the search for the best experimental conditions to obtain the most efficient uranium adsorbent, two different solvent systems were investigated: ethylene carbonate/water (EC/H$_2$O) and dimethylformamide/methanol (DMF/MeOH). For most monomers, the solvents used for their polymerization can be easily categorized in three groups: poor, good, and the "θ-solvent". In a poor solvent system, polymer-polymer or monomer-monomer interactions are favored, which may manifest in lower grafting yields, the contraction of polymer chains, and subsequent accessibility issues. However, in a good solvent system, interactions between polymer segments and solvent molecules are favored; i.e., polymer chains are well-solvated and expand through the whole volume, which may raise the risk of pore blockage. In the case of polymerizing inside cavities, such as the pores of activated carbons, both aforementioned situations should be avoided. Significantly, at the θ condition, the effects of volume expansion are cancelled. It has been reported that an 80:20 ratio of DMF and MeOH is a θ-solvent for the polymerization of acrylonitrile (Wu, Q. Y., et al., *Journal of Physical Chemistry B*, 2012, 116 (28), 8321-8330). Therefore, two carbon trunk materials were used to study the effect of solvent: oxidized mesoporous carbon (sample #7) and non-oxidized activated carbon (sample #8). Fairly low grafting yields were observed (7.4% and 10.2% for #7 and #8, respectively) with fairly high uranium adsorption capacities (3.85 and 2.80 g-U/kg-ads).

The EC/H$_2$O solvent system (85:15 by weight) was particularly intriguing by indicating a possible changing of the polymer tacticity (Simionescu, B. C., et al., *European Polymer Journal*, 1991, 27 (7), 589-591). There are indications that the ideal binding of one uranyl species may require two to three amidoxime groups and that the amidoxime groups may be more effective when they are in cyclic form ((a) Das, S., et al., *Desalination*, 2008, 232 (1-3), 243-253; (b) Vukovic, S., et al., *Inorganic Chemistry*, 2012, 51 (6), 3855-3859); and (c) Kang, S. O., et al., *Industrial & Engineering Chemistry Research*, 2012, 51 (19), 6619-6624). Therefore, the presence of isotactic polyacrylonitrile, in which the nitriles are located on the same side of the polymer backbone, is particularly desirable for the instant purposes. For comparison of the two solvent systems, the same carbon supports were used (refer to samples #1 & 2 for EC/H$_2$O system and samples #7 & 8 for DMF/MeOH). The grafting yield obtained for both samples using EC/H$_2$O (Table 3, below) were higher than that of the analogous samples prepared in DMF/MeOH. Regarding uranium adsorption, the value recorded for the sample grafted onto a-C was comparable to the one obtained in the θ-solvent. Although the results for PAN-grafted o-C (sample #1) indicate DMF/MeOH as a better choice of solvent, oxidized activated carbon with PAN grafted inside the pore (sample #4) exhibited a higher grafting yield and uranium adsorption capacity. Entries #2, 9, and 10 in Table 3 illustrate how both parameters changed as a function of further reduction of the amounts of solvent during the synthesis.

TABLE 3

Uranium adsorption capacities and distribution coefficients for all studied materials[a]

| Sample | $S_{BET}$ (m$^2$/g) | Grafting (%) | U ads. cap. (g-U/kg-ads) | $K_d$ | U cap. (μg-U/m$^2$) |
|---|---|---|---|---|---|
| 1 | 148 | 12.0 | 0.39 | 0.10 | 2.63 |
| 2 | 1206 | 12.0 | 2.09 | 0.54 | 1.73 |
| 3 | 1094 | 16.2 | 3.11 | 2.02 | 2.84 |
| 4 | 595 | 24.0 | 4.05 | 2.48 | 6.81 |
| 5 | 1210 | 24.5 | 2.81 | 1.31 | 2.32 |
| 6 | 598 | 16.6 | 3.76 | 2.20 | 6.29 |
| 7 | 546 | 7.4 | 3.85 | 3.18 | 7.05 |
| 8 | 352 | 10.2 | 2.80 | 1.55 | 7.95 |
| 9 | 1291 | 12.9 | 1.60 | 0.60 | 5.50 |
| 10 | 1087 | 16.2 | 2.57 | 2.93 | 2.36 |
| 11 | 985 | 19.3 | 3.27 | 1.80 | 3.32 |
| 12 | 529 | 23.2 | 1.88 | 0.61 | 3.55 |
| 13 | 517 | 26.1 | 2.78 | 1.05 | 5.38 |
| 14 | 328 | 20.2 | 4.62 | 3.15 | 14.08 |
| 15 | 996 | 25.6 | 2.86 | 1.00 | 2.87 |
| 16 | 416 | 26.7 | 3.43 | 1.57 | 8.24 |
| 17 | 475 | 27.5 | 3.97 | 2.36 | 8.35 |
| 18 | 270 | 28.4 | 4.18 | 3.00 | 15.48 |
| 19 | 691 | 19.5 | 3.55 | 2.92 | 5.14 |

[a]Notation: Uranium adsorption capacity U ads. cap. = {(Ci-Cf)} × {volume of solution [mL]}/{mass of adsorbent [g]}; Distribution coefficient $K_d$ = {(Ci-Cf)/Cf} × {volume of solution [mL]}/{mass of adsorbent [g]}, where Ci and Cf represent the initial and final solution concentrations; Normalized uranium capacity U cap. = U ads. cap./$S_{BET}$.

The Effect of Reduced Amount of Monomer in Different Solvents

Figures 5A, 5B:
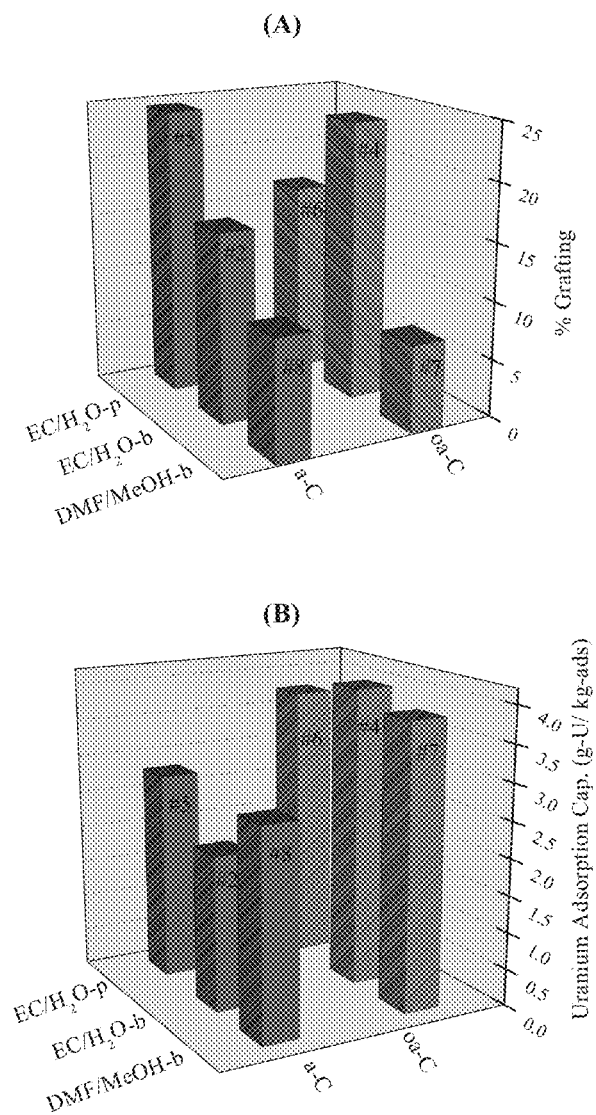
FIGS. 5(A), 5(B). Comparison of the grafting yield (FIG. 5A) and uranium adsorption capacities (FIG. 5B) obtained under different experimental conditions, including selection of solvent system and mild vs. high intensity sonication.

The effect of reducing the amount of monomer was studied to better evaluate the two solvent systems. For this study, the grafting was performed on oa-C carbon under high intensity sonication. Sample #11 (Table 3) refers to the sample prepared in the θ-solvent with the normal amount of AN. When the AN amount was halved (Entry #12), the uranium uptake dropped by 40%. However, similar conditions in EC/H$_2$O surprisingly resulted in an improved uranium adsorption (refer to sample #13 & 6, respectively). Shown in FIGS. 5(A) and 5(B) are combined results presenting the grafting degree and uranium adsorption capacities for adsorbents prepared with activated and oxidized-activated carbons under different solvent and sonication conditions. FIGS. 5A and 5B indicate moderate to substantial effects in both grafting yield and uranium adsorption capacity by choice of solvent system, sonication power, and activation process. In particular, the selection of solvent system can favorably adjust the polymer structure inside the pores during synthesis, and this can provide better site accessibility with significantly improved uranium adsorption.

The Effect of Increased Initiator Amount with Respect to Grafting Under Mild and High Intensity Sonication Thus far, the studies presented illustrate how different conditions, such as porosity, surface treatment of carbons, and the choice of solvent and its amount, affect the quantity of polymer grafted onto mesoporous carbons, and subsequently, their performance as adsorbents for uranium recovery. It has been proposed that the grafting reaction heavily relies on the amount of initiator trapped in the pores of a support. Therefore, each carbon material was impregnated with a solution containing the dissolved initiator prior to a synthesis, and then dried. Furthermore, the initiator/carbon ratio was kept fairly high (typically, 3:1 by weight). This approach raises the risk of possible pore blockage, yet this was not observed. The comparison of thermogravimetric data obtained for samples synthesized under mild sonication (samples #6 & 14) and high intensity sonication (samples #15 & 16) show relatively similar values. It was found for all samples that the 30% increase of initiator resulted in only a minor increase in the grafting percentage.

Surprisingly, the amount of uranium recovered varies to a much larger degree. Samples prepared with mild sonication have capacities exceeding 4 mg-U/kg-ads (4.05 and 4.62 mg-U/kg-ads for sample #6 & 14, respectively), which are among the highest reported in this work, while their analogs synthesized with the use of high intensity sonication exhibited 25-30% lower capacities. The fact that the grafting yield is very similar in all cases suggests an optimum amount of initiator was determined in this work, after which little effect is observed. However, changes in the uranium adsorption capacities may indicate that the grafting reaction proceeds in a different manner under mild and high intensity sonication.

Figure 6:
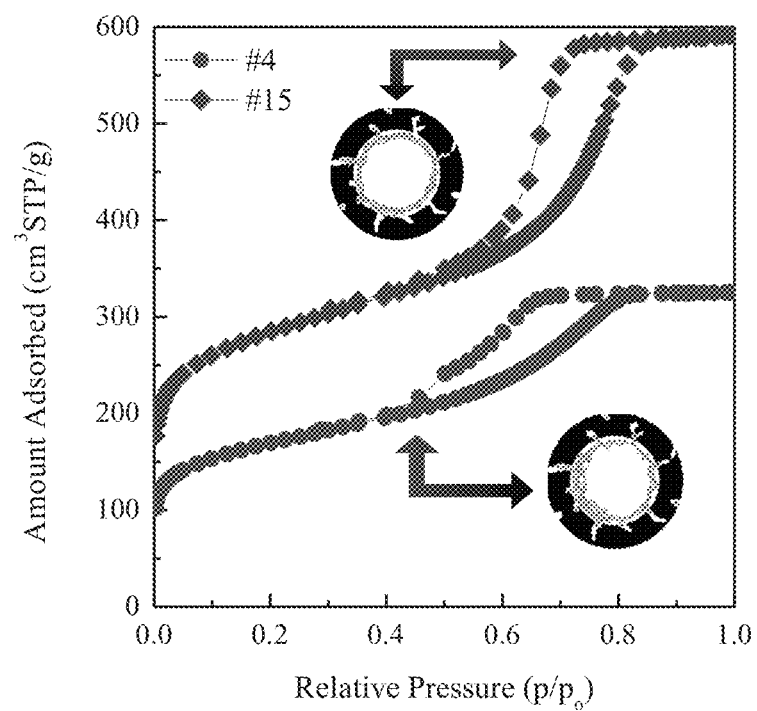
FIG. 6. Nitrogen adsorption isotherms with a schematic illustration of the PAN distribution inside the mesoporous carbon pores grafted under mild and high intensity sonication.

The structural data evaluated from the nitrogen adsorption isotherms presented in FIG. 6 help explain the aforementioned differences. First is the higher surface area of carbon adsorbent #15 (prepared under high intensity sonication). A higher BET surface area remaining after grafting suggests fewer micropores are filled with polymer, which serves as anchoring points for the growing polymer chains. Additionally, the nitrogen sorption isotherm for sample #15 is characterized by a clear H1-type hysteresis loop, which suggests the presence of non-constricted mesopores. The uniform steepness of the desorption branch indicates homogeneity of the PAN layer grafted onto the mesopores, which is quite different from the tailing of the desorption step observed in case of the adsorbent material obtained under mild sonication (sample #4). The tailing of the desorption branch of the isotherm provides a good indication for a more heterogeneous distribution of the polymer forming constrictions in the mesopores, which could influence the metal sorption performance.

The Effect of Power

The sonic probe used as a source of high intensity sonication offers the possibility of changing the power applied to the sonic horn (maximum 750 W), in contrast to the ultrasonic bath that operates with a fixed power of 100 W. A series of four samples were prepared, starting from 50% power and then increasing by 10% with each sample to 80% power (refer to samples #17 through #19). This action resulted in very high grafting yields, reaching almost 30% (Table 3). Interestingly, the increasing trend does not continue throughout the entire series; after reaching a maximum at 70% power, the grafting degree dramatically drops, to below that obtained at 50% power. The uranium adsorption capacity data were found to be the best recorded in the study for adsorbents synthesized under high intensity sonication (4.18 mg-U/kg-ads for adsorbent #18) and comparable to that obtained under mild sonication (4.62 mg-U/kg-ads for sample #14). The high uranium capacities, resulting from more conformal polymer coatings on the mesopores, coupled with the shorter synthesis times, suggest an advantage in using high intensity sonication to polymerize PAN onto carbon trunks.

Distribution Coefficient ($K_d$) and Normalized Adsorption

While the uranium adsorption capacity is a direct measure of the amount of uranium adsorbed by an adsorbent, the distribution coefficient, $K_d$, reflects the adsorbent's affinity for the adsorbate. Data shown in Table 3 indicate that samples possessing relatively high uranium adsorption capacities may not have a correspondingly high distribution coefficient. Based on that, the evaluation of $K_d$ is an important factor in selecting the most promising adsorbents for further testing.

Although selectivity studies have not yet been performed, it has been shown that amidoxime functionalized materials exhibit much higher selectivity for uranium and vanadium over a range of competing metal ions such as cobalt, nickel and copper (e.g., Kavakli, P. A., et al., *Adsorption-Journal of the International Adsorption Society*, 2004, 10 (4), 309-315).

Since a direct relationship between grafting yield and the observed uranium adsorption capacity for fiber-based adsorbents is generally not appropriate for the evaluation of the performance of porous adsorbents, a new parameter known as the normalized capacity was developed. The latter parameter correlates uranium adsorption capacity with BET surface area remaining after grafting. Expressed in $\mu g$-$U/m^2$, this normalized capacity provides insight into the specific surface area of the studied adsorbents accessible to and participating in uranium adsorption. The comparison of the samples with highest uranium uptake, their grafting yields, and normalized capacities (e.g., samples #4, 14 and 18 in Table 3) clearly indicate that, although each possess comparable grafting percentages and uranium adsorption capacities, adsorbents #14 & 18 exhibit significantly more active binding sites per square meter of surface area than sample #4.

Figure 7:
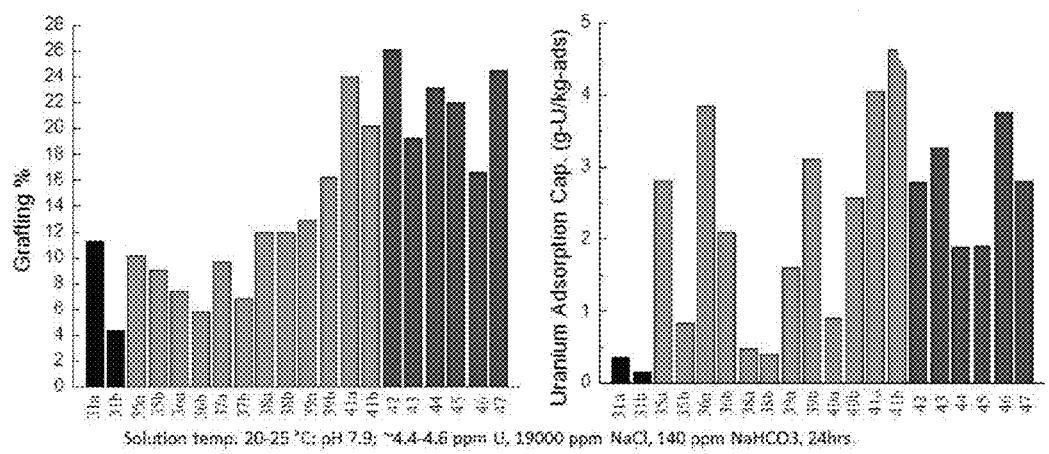
FIG. 7. Grafting yield (left bar chart) and uranium adsorption capacities (right bar chart) obtained for carbon adsorbents prepared under conventional and sonochemical polymerizations.

The comparison of three different polymerization conditions on grafting yield (left bar chart) and uranium absorption capacities (right bar chart) is presented in FIG. 7. As one can see, the conventional polymerization (first two bars on left, i.e., samples 31a and 31b) leads to rather poor grafting and uranium adsorption capacities. Grafting performed under mild sonication (samples 35a-41b) and high intensity sonication (samples 42-47) in most cases double the amount of polymer fixed to the carbon pore walls, reaching almost 30%. This translates to a greatly improved uranium uptake, which can be three times better than the one obtained by conventional polymerization.

Effect of Combining Soft- and Hard-Templating Method on Uranium Adsorption

Figure 8A:
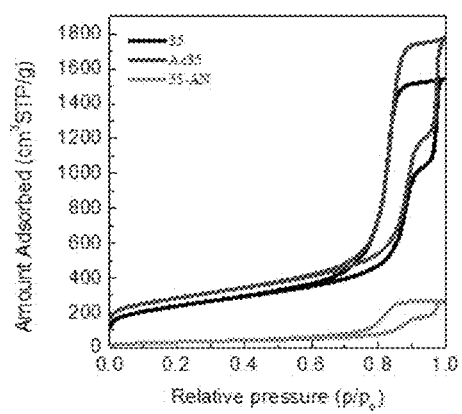
FIGS. 8(A), 8(B). Nitrogen adsorption isotherm (FIG. 8A) and corresponding pore size distributions (FIG. 8B) for carbon adsorbents prepared with 35 nm silica colloids.
Figure 8B:
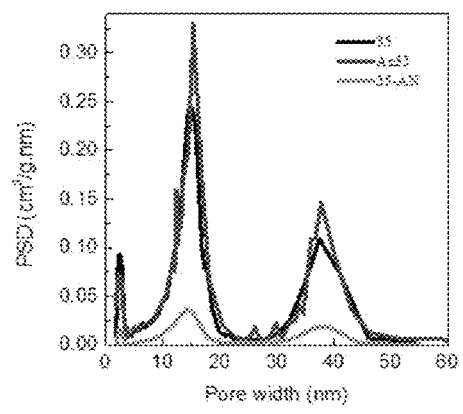

The uranium adsorption capacity can be improved even more by combining the soft- and hard-templating method in the synthesis of carbon support materials. The typical soft-templating approach is based on the polymer-polymer interaction between a phenolic resin-type carbon precursor and a triblock copolymer used as soft template. The thermal decomposition of the copolymer creates uniform cylindrical mesopores of ~8-10 nm in diameter. The dissolution of silica colloids added to the synthesis gel introduces pores with a spherical geometry and a size that can be easily tailored by the choice of silica colloids used. Shown in FIGS. 8A and 8B are nitrogen adsorption isotherms and corresponding pore size distributions, respectively, for the representative series of samples prepared with 35 nm silica colloids.

The double capillary condensation step on the adsorption branch indicates the presence of two distinct systems of pores. After activation, some additional microporosity is created, which is manifested as higher nitrogen uptake. PAN grafting inside the pores greatly reduces all adsorption parameters (see Table 4 below).

TABLE 4

Structural and adsorption parameters for precursor carbons and functionalized carbon adsorbents obtained with 35 nm and 50 nm silica colloids

| Sample | $S_{BET}$ (m²/g) | $V_t$ (cm³/g) | $V_{mi}$ (cm³/g) | $V_{me}$ (cm³/g) | $w_{KJS}$ (nm) | $R_{TGA}$ (%) | Grafting (%) | U ads. cap. (g-U/kg-ads) |
|---|---|---|---|---|---|---|---|---|
| 35 | 858 | 2.33 | 0.10 | 1.30 | 15.1 | 75 | — | — |
| 50 | 801 | 2.12 | 0.08 | 1.22 | 14.7 | 72 | — | — |

TABLE 4-continued

Structural and adsorption parameters for precursor carbons and functionalized carbon adsorbents obtained with 35 nm and 50 nm silica colloids

| Sample | $S_{BET}$ (m²/g) | $V_t$ (cm³/g) | $V_{mi}$ (cm³/g) | $V_{me}$ (cm³/g) | $w_{KJS}$ (nm) | $R_{TGA}$ (%) | Grafting (%) | U ads. cap. (g-U/kg-ads) |
|---|---|---|---|---|---|---|---|---|
| Ac35 | 1012 | 2.75 | 0.08 | 1.49 | 15.2 | 6 | — | — |
| Ac 50 | 924 | 2.37 | 0.06 | 1.32 | 15.0 | 4 | — | — |
| Ac35-AN | 120 | 0.40 | 0.01 | 0.24 | 14.3 | — | 22 | 15.5 |
| Ac50-AN | 91 | 0.32 | 0.01 | 0.19 | 14.4 | — | 31 | 22.3 |

Figure 9A:
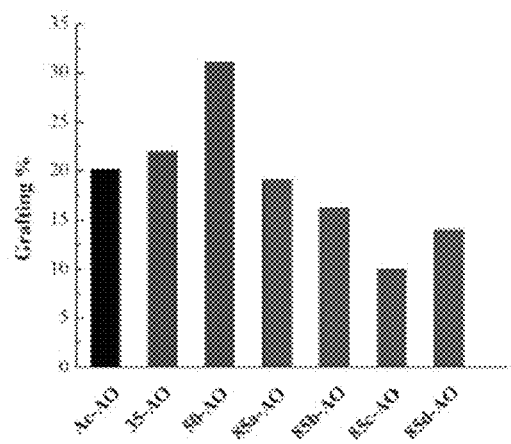
FIGS. 9(A), 9(B). Grafting yield (FIG. 9A) and uranium adsorption capacity (FIG. 9B) for carbon adsorbents with hierarchical porosity. Leftmost sample (Ac-AO) corresponds to the best activated carbon adsorbent from the previous series (possessing micropores and mesopores ~10 nm only) used here for comparison. The rest of the samples were labeled according to the size of nanoparticles used, i.e. 35, 50 and 85 nm. For samples prepared with 85 nm silica colloids the synthesis parameters were varied to obtain different pore regimes (details provided in Table 5).
Figure 9B:
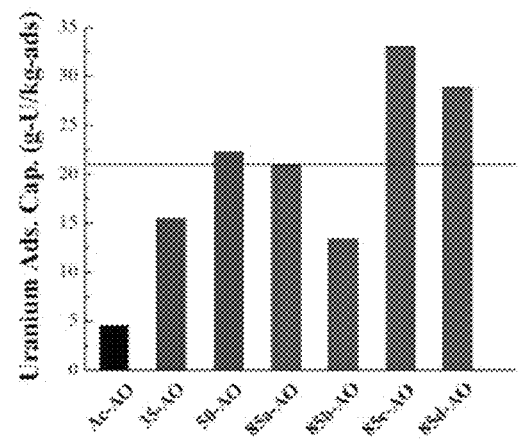
Figure 10:
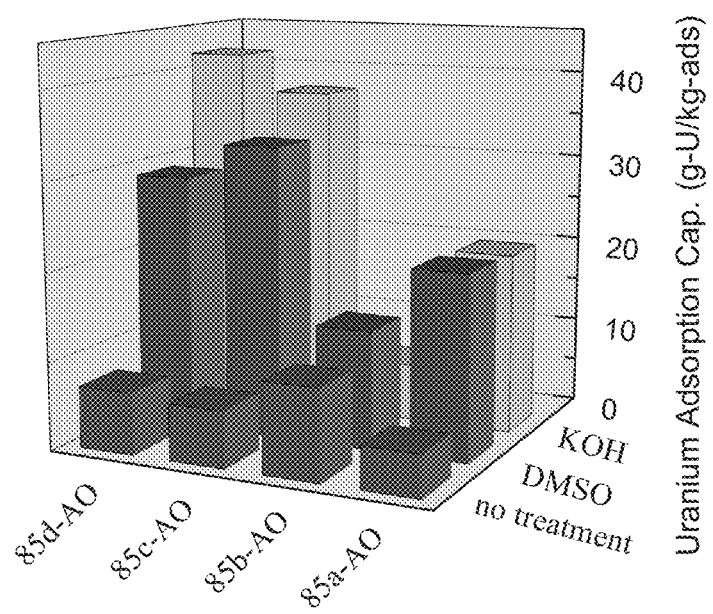
FIG. 10. Multidimensional bar chart showing the effect of different pre-treatments (e.g., KOH, DMSO, or no pretreatment) on mesoporous carbons having pores of 85 nm.

$^a$Notation: $S_{BET}$- BET specific surface area; $V_t$- single-point pore volume; $V_{mi}$- volume of fine pores (mainly micropores) obtained by integration of PSD up to 3.5 nm; $V_{me}$- volume of mesopores obtained by integration of PSD from 4 nm to 20 nm; $w_{KJS}$- mesopore diameter at the maximum of the PSD curve obtained by the modified KJS method; Grafting % obtained in the temperature range 110-450° C. from the TG curve recorded in nitrogen; Uranium adsorption capacity obtained from ICP-OES measurements and calculated according to the formula: U ads. cap. = {(Ci – Cf)} × {volume of solution [mL]}/{mass of adsorbent [g]}, where Ci and Cf represent the initial and final solution concentrations Note that grafting seems to occur fairly homogeneously in all types of pores without blocking them. As evident from FIGS. 9(A) and 9(B), although the grafting yield remains around 20%, the uranium uptake dramatically increased. This is due to the presence of larger mesopores introduced to the carbon matrix, which facilitates the mass transport throughout the bulk of the adsorbent material. The effect of the presence of pores even larger than 35 nm on the metal adsorption capacity is also presented on FIGS. 9(A) and 9(B) and in Table 5, below. By manipulating the pore size, i.e. increasing pore diameters from 10 nm (in Ac-AO) up to 85 nm, the capacity increases dramatically, surpassing the commercial adsorbent in screening tests (6 ppm U, simulated seawater). Microporosity is not needed for high uranium capacities, although higher grafting yields are achieved indicating possible blockage of sites (potential size effect). Conditioning the grafted polymer in KOH results in higher capacities than thermally treating the polymer with DMSO (sonication-based polymerization). Moreover, FIG. 10 shows the effect of different pre-treatments (e.g., KOH, DMSO, or no pretreatment) on mesoporous carbons having pores of 85 nm. FIG. 10 demonstrates the significant benefit in subjecting the mesoporous carbon to a pretreatment (activation) process to render the amidoxime system more highly effective in uranium adsorption capacity. As further shown in FIG. 10, as well as Table 5 below, the effects of the pretreatment process on amidoxime capacity is substantially influenced by the initial pore structure. Thus, the uranium adsorption capacity of the amidoxime system can be optimized by judicious selection of pretreatment process and initial porosity.

TABLE 5

Structural and performance parameters for carbon adsorbents prepared with 85 nm silica nanoparticles and varied pore regimes

| Sample | Pore regime | $S_{BET}$ (m²/g) | Grafting (%) | Uranium adsorption cap. (g-U/kg-ads) | | |
|---|---|---|---|---|---|---|
| | | | | No treatment | DMSO | KOH |
| 85a-AO | 2/10/85 | 260 | 19.1 | 4.8 | 20.9 | 20.5 |
| 85b-AO | 2/85 | 283 | 16.2 | 10.3 | 13.4 | 6.5 |
| 85c-AO | 85 | — | 10.0 | 6.4 | 33.0 | 37.8 |
| 85d-AO | 10/85 | 103 | 14.0 | 7.0 | 28.9 | 41.9 |

CONCLUSIONS

Sonochemical grafting of polyacrylonitrile into the pores of soft-templated mesoporous carbons resulted in a successful preparation of an adsorbent material for uranium recovery from seawater. Sonochemical polymerization of acrylonitrile proved to be very efficient in eliminating the drawbacks associated with conventional free radical polymerization, such as pore blockage and subsequent poor adsorbent performance. It has herein been shown that the cavitation process related to sonication can greatly enhance the polymerization reaction not only by the formation of reactive species, such as radicals, but also by efficient mixing and mass transport of the reagents, thus leading to their more uniform distribution inside the pores of a support material. Moreover, the foregoing results illustrate the effect of the pre-treatment of the carbon surface on the grafting yield and uranium adsorption capacity. Oxidation or activation alone generally provided a lower amount of polymer attached to the carbon pore walls with moderate to inferior grafting and metal uptake values. However, when oxidation and activation were combined, both parameters (grafting and metal uptake) were almost doubled. Based on this, the presence of a substantial amount of complementary pores (micro- and small mesopores) as anchoring points for the growing polymer (created by activation) and a more hydrophilic carbon surface (resulting from oxidation) may be crucial for improved performance. Although PAN polymerization proceeds in a slightly different manner under mild and high intensity sonication, the overall sorbents' performances are comparable.

While there have been shown and described what are at present considered the preferred embodiments of the invention, those skilled in the art may make various changes and modifications which remain within the scope of the invention defined by the appended claims.

What is claimed is:

1. A functionalized mesoporous carbon composition comprising a mesoporous carbon scaffold having: (i) mesopores in which polyvinyl polymer grafts are covalently attached, and (ii) macropores having a size greater than 50 nm and up to 200 nm, wherein said mesopores have a size of at least 2 nm and up to 50 nm, and said carbon is elemental carbon.

2. The functionalized mesoporous carbon composition of claim 1, wherein the polyvinyl polymer grafts are comprised of the formula:

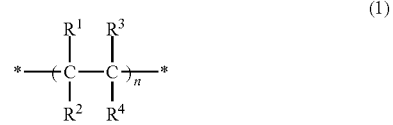

(1)

wherein $R^1$, $R^2$, $R^3$, and $R^4$ are independently selected from hydrogen atom, hydrocarbon groups having at least 1 and up to 12 carbon atoms, and heteroatom-containing groups comprising at least one heteroatom selected from nitrogen, oxygen, sulfur, and phosphorus; and the subscript n is an integer of at least 2.

3. The functionalized mesoporous carbon composition of claim 2, wherein at least one of $R^1$, $R^2$, $R^3$, and $R^4$ is comprised of a nitrile group.

4. The functionalized mesoporous carbon composition of claim 2, wherein at least one of $R^1$, $R^2$, $R^3$, and $R^4$ is comprised of a heteroatom-containing functional group that can bind to metal ions.

5. The functionalized mesoporous carbon composition of claim 4, wherein at least one of $R^1$, $R^2$, $R^3$, and $R^4$ is comprised of a carboxylate, keto, aldo, amino, imino, amido, or oxime group.

6. The functionalized mesoporous carbon composition of claim 4, wherein at least one of $R^1$, $R^2$, $R^3$, and $R^4$ is comprised of an amidoxime group.

7. The functionalized mesoporous carbon composition of claim 2, wherein at least one of $R^1$, $R^2$, $R^3$, and $R^4$ is comprised of a negatively-charged group.

8. The functionalized mesoporous carbon composition of claim 7, wherein said negatively-charged group is a sulfonate or carboxylate group.

9. The functionalized mesoporous carbon composition of claim 2, wherein at least one of $R^1$, $R^2$, $R^3$, and $R^4$ is an unsubstituted hydrocarbon group having at least four carbon atoms.

10. The functionalized mesoporous carbon composition of claim 1, wherein the pore volume due to mesopores is greater than the pore volume due to micropores.

11. A method for fabricating a functionalized mesoporous carbon composition, the method comprising subjecting a reaction medium comprising a precursor mesoporous carbon, vinyl monomer, initiator, and solvent to sonication of sufficient power to result in grafting and polymerization of said vinyl monomer into mesopores of said precursor mesoporous carbon to produce said functionalized mesoporous carbon composition, wherein said mesopores have a size of at least 2 nm and up to 50 nm and wherein said mesoporous carbon scaffold also contains macropores having a size greater than 50 nm and up to 200 nm, and said carbon is elemental carbon.

12. The method of claim 11, wherein said precursor mesoporous carbon is activated to increase its specific surface area, prior to the precursor mesoporous carbon being included in said reaction medium and subjected to said sonication.

13. The method of claim 11, wherein said vinyl monomer has the formula:

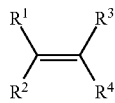

(2)

wherein $R^1$, $R^2$, $R^3$, and $R^4$ are independently selected from hydrogen atom, hydrocarbon groups having at least 1 and up to 12 carbon atoms, and heteroatom-containing groups comprising at least one heteroatom selected from nitrogen, oxygen, sulfur, and phosphorus.

14. The method of claim 13, wherein at least one of $R^1$, $R^2$, $R^3$, and $R^4$ is comprised of a nitrile group.

15. The method of claim 13, wherein at least one of $R^1$, $R^2$, $R^3$, and $R^4$ is comprised of a heteroatom-containing functional group that can bind to metal ions.

16. The method of claim 15, wherein at least one of $R^1$, $R^2$, $R^3$, and $R^4$ is comprised of a carboxylate, keto, aldo, amino, imino, amido, or oxime group.

17. The method of claim 15, wherein at least one of $R^1$, $R^2$, $R^3$, and $R^4$ is comprised of an amidoxime group.

18. The method of claim 13, wherein at least one of $R^1$, $R^2$, $R^3$, and $R^4$ is comprised of a negatively-charged group.

19. The method of claim 18, wherein said negatively-charged group is a sulfonate or carboxylate group.

20. The method of claim 13, wherein at least one of $R^1$, $R^2$, $R^3$, and $R^4$ is an unsubstituted hydrocarbon group having at least four carbon atoms.

21. The method of claim 11, wherein the pore volume due to said mesopores is greater than the pore volume due to micropores in said functionalized mesoporous carbon composition.

22. A method for extracting metal ions from a liquid solution containing metal ions, the method comprising contacting said liquid solution with a functionalized mesoporous carbon composition comprising a mesoporous carbon scaffold having mesopores in which polyvinyl polymer grafts are covalently attached, wherein at least a portion of said polyvinyl polymer grafts are comprised of heteroatom-containing functional groups that can bind to said metal ions, wherein said mesopores have a size of at least 2 nm and up to 50 nm, and wherein said mesoporous carbon scaffold also contains macropores having a size greater than 50 nm and up to 200 nm, and said carbon is elemental carbon.

23. The method of claim 22, wherein said heteroatom-containing functional groups are selected from carboxylate, keto, aldo, amino, imino, amido, oxime, and amidoxime groups.

24. The method of claim 22, wherein said heteroatom-containing functional groups are selected from negatively-charged groups.

25. The method of claim 22, wherein the polyvinyl polymer grafts are comprised of the formula:

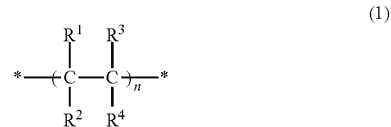

(1)

wherein $R^1$, $R^2$, $R^3$, and $R^4$ are independently selected from hydrogen atom, hydrocarbon groups having at least 1 and up to 12 carbon atoms, and heteroatom-containing groups comprising at least one heteroatom selected from nitrogen, oxygen, sulfur, and phosphorus; and the subscript n is an integer of at least 2.

26. The method of claim 22, wherein the pore volume due to said mesopores is greater than the pore volume due to micropores in said functionalized mesoporous carbon composition.

27. The method of claim 22, wherein said metal ions are selected from transition, lanthanide, and actinide metal ions.

* * * * *